United States Patent
Douze et al.

(10) Patent No.: US 11,093,561 B2
(45) Date of Patent: Aug. 17, 2021

(54) FAST INDEXING WITH GRAPHS AND COMPACT REGRESSION CODES ON ONLINE SOCIAL NETWORKS

(71) Applicant: Facebook, Inc., Menlo Park, CA (US)

(72) Inventors: Matthys Douze, Montreuil (FR); Alexandre Sablayrolles, Paris (FR); Hervé Jegou, Thorigne-Fouillard (FR)

(73) Assignee: Facebook, Inc., Menlo Park, CA (US)

( * ) Notice: Subject to any disclaimer, the term of this patent is extended or adjusted under 35 U.S.C. 154(b) by 213 days.

(21) Appl. No.: 16/215,322

(22) Filed: Dec. 10, 2018

(65) Prior Publication Data

US 2019/0179858 A1 Jun. 13, 2019

Related U.S. Application Data

(60) Provisional application No. 62/597,012, filed on Dec. 11, 2017.

(51) Int. Cl.
*G06F 16/24* (2019.01)
*G06F 16/951* (2019.01)
(Continued)

(52) U.S. Cl.
CPC ........ *G06F 16/951* (2019.01); *G06F 16/2365* (2019.01); *G06F 16/24542* (2019.01);
(Continued)

(58) Field of Classification Search
CPC ........... G06F 16/9024; G06F 16/24578; G06F 16/2246; G06F 16/248; G06F 16/3347;
(Continued)

(56) References Cited

U.S. PATENT DOCUMENTS

2013/0311458 A1 11/2013 Goel
2016/0042253 A1* 2/2016 Sawhney ............. G06K 9/6218
382/190

(Continued)

FOREIGN PATENT DOCUMENTS

WO WO 2012/015631 A1 2/2012
WO WO 2014/179426 A1 11/2014
WO WO 2015/073565 A1 5/2015

OTHER PUBLICATIONS

Ge et al. "Optimized Product Quantization", Nov. 14, 2013.*

(Continued)

*Primary Examiner* — Apu M Mofiz
*Assistant Examiner* — Cindy Nguyen
(74) *Attorney, Agent, or Firm* — Baker Botts L.L.P.

(57) ABSTRACT

In one embodiment, a method includes receiving a query comprising a query content object and constraints, generating a feature vector representing the query content object, accessing a sparse graph comprising nodes corresponding to candidate content objects represented by compact codes and links connecting the nodes, selecting an entry node, selecting similar content objects iteratively by identifying linked nodes of the entry node, decompressing the compact codes representing candidate content objects to generate feature vectors, selecting zero or more similar content objects based on a comparison between the feature vector representing the query content object and the feature vectors representing the candidate content objects, returning the selected similar content objects if a completion condition is satisfied, else repeating the iterative selection by using a linked node corresponding to a most similar content object as the entry node, and sending instructions for presenting one or more of the selected similar content objects.

19 Claims, 14 Drawing Sheets

(51) Int. Cl.
  *G06F 16/9536* (2019.01)
  *G06N 20/20* (2019.01)
  *G06F 16/23* (2019.01)
  *G06F 16/901* (2019.01)
  *G06F 16/2453* (2019.01)
  *G06Q 50/00* (2012.01)

(52) U.S. Cl.
  CPC ...... *G06F 16/9024* (2019.01); *G06F 16/9536* (2019.01); *G06N 20/20* (2019.01); *G06Q 50/01* (2013.01)

(58) Field of Classification Search
  CPC ...... G06F 16/51; G06F 16/285; G06F 16/137; G06F 16/2237; G06F 16/903; G06F 16/283; G06F 16/538; G06F 16/24568; G06F 16/21; G06F 16/2255; G06F 16/23
  See application file for complete search history.

(56) References Cited

U.S. PATENT DOCUMENTS

| | | |
|---|---|---|
| 2017/0212930 A1 | 7/2017 | Carter |
| 2017/0351710 A1 | 12/2017 | Zhu |
| 2018/0341720 A1* | 11/2018 | Bhatia .................. G06N 5/003 |

OTHER PUBLICATIONS

Malkov et al. "Approximate nearest neighbor algorithm based on navigable small world graphs", Elsevier Ltd, , 2013.*
International Search Report and Written Opinion for International Application No. PCT/ US2018/064828, dated Apr. 1, 2019.
International Preliminary Report on Patentability and Written Opinion for International Application No. PCT/ US2018/064828, dated Jun. 25, 2020.
EESR received from EPO for EP Patent Application No. EP18889785, dated Nov. 10, 2020.
LUQI: Real-Time Constraints in A Rapid Prototyping Language, Computer Languages, Pergamon Press, New York, NY, US, vol. 18, No. 2, pp. 77-103, 1993.
Belongie, Serge, Jitendra Malik, and Jan Puzicha. "Shape matching and object recognition using shape contents." *IEEE transactions on pattern analysis and machine intelligence* 24, No. 4 (Aug. 7, 2002): 509-522.
Çiçek, Özgüun, Ahmed Abdulkadir, Soeren S. Lienkamp, Thomas Brox and Olaf Ronneberger. "3D U-Net: learning dense volumetric from sparce annotation." In *International conference on medical image computing and computer-assisted intervention*, pp. 424-432. Springer, Cham, Oct. 17, 2016.
Engelcke, Martin, Dushyant Rao, Dominic Zeng Wang, Chi Hay Tong, and Ingmar Posner. "Vote3deep: Fast object detection in 3d point clouds using efficient convolutional neural networks." in *2017 IEEE International Conference on Robotics and Automation (ICRA)* , pp. 1355-1361. IEEE, May 29, 2017.
Graham, Ben. "Sparse 3D convolutional neural networks." arXiv preprint arXiv:1505.02890 (May 12, 2015).
Gupta, Saurabh, Pablo Arbelaez and Jitendra Malik. "Perceptual organization and recognition of indoor scenes from RGB-D images." In *Proceedings of the IEEE Conference on Computer Vision and Pattern Recognition*, pp. 564-571. 2013.
He, Kaiming, Xiangyu Zhaang, Shaoqing Ren, and Jian Sun. "Deep residual learning for image recognition." In *Proceedings of the IEEE conference on computer vision and pattern recognition*, pp. 770-778. 2016.
He, Kaiming, Xiangyu Zhang, Shaoqing Ren and Jian Sun. "Identity mappings in deep residual networks." in *European conference on computer vision*, pp. 630-645. Springer, Cham, Oct. 8, 2016.
Huang, Gao, Zhuang Liu, Laurens van der Maaten, and Kilian Q. Weinberger. "Densely Connected Convolutional Networks. arXiv e-prints, art." *arXiv preprint arXiv:1608.06993* (Aug. 2016).
Klokov, Roman, and Victor Lempitsky. "Escape from cells: Deep kd-networks for the recognition of 3d point cloud models." In *Proceedings of the IEEE International Conference on Computer Vision*, pp. 863-872. 2017.
Yi, Li, Hao Su, Xingwen Guo, and Leonidas J. Guibas. "Syncspeccnn: Synchronized and spectral cnn for 3d shape segmentation." In *Proceedings of the IEEE Conference on Computer Vision and Pattern Recognition*, pp. 2282-2290. 2017.
LeCun, Yann, John Denker, and Sara Solla. "Optimal brain damage." *Advances in neural information processing systems* 2 (1989): 598-605.
Liu, Baoyuan, Min Wang, Hassan Foroosh, Marshall Tappen and Marianna Pensky. "Sparce convolutional neural networks." In *Proceedings of the IEEE conference on computer vision and pattern recognition*, pp. 806-814. 2015.
Long, Jonathan, Evan Shelhamer, and Trevor Darrell. "Fully convolutional networks for semantic segmentation." In *Proceedings of the IEEE conference on computer vision and pattern recognition*, pp. 3431-3440. 2015.
Maturana, Daniel, and Sebastian Scherer. "Voxnet: A 3d convolutional neural network for real-time object recognition." In *2015 IEEE/RSJ International Conference on Intelligent Robots and Systems (IROS)* , pp. 922-928. IEEE, Sep. 28, 2015.
Silberman, Nathan, Derek Hoiem, Pusshmeet Kohli and Rob Fergus. "Indoor segmentation and support inference from rgbd images." In *European conference on computer vision*, pp. 746-760. Springer, Berlin, Heidelberg, Oct. 7, 2012.
Qi, Charles R., Hao Su, Kaichun Mo, and Leonidas J. Guibas. "Pointnet: Deep learning on point sets for 3d classification and segmentation." In *Proceedings of the IEEE conference on computer vision and pattern recognition*, pp. 652-660. 2017.
Riegler, Gernot, Ali Osman Ulusoy and Andreas Geiger. "Octnet: Learning deep 3d representations at high resolutions." In *Proceedings of the IEEE Conference on Computer Vision and Pattern Recognition*, pp. 3577-3586. 2017.
Ronneberger, Olaf, Philipp Fischer, and Thomas Brox. "U-net: Convolutional networks for biomedical image segmentation." In *International Conference on Medical image computing and computer-assisted intervention*, pp. 234-241. Springer, Cham, Oct. 5, 2015.
Simonyan, Karen, and Andrew Zissserman. "Very deep convolutional networks for large-scale image recognition." *arXiv preprint arXiv: 1409.1556* (Sep. 4, 2014).
Yi, Li, Lin Shao, Manolis Savva, Haibin Huang, Yang Zhou, Qirui Wang, Benjamin Graham et al. "Large-scale 3d shape reconstruction and segmentation from shapenet core55." *arXiv preprint arXiv: 1710.06104* (Sep. 4, 2017).
Yu, Fisher, and Vladlen Koltun. "Multi-scale context aggregation by dilated convolutions." *arXiv preprint arXiv: 1511.07122* (Nov. 23, 2015).
Yu, Fisher, Vladlen Koltun, and Thomas Funkhouser. "Dilated residual networks." In *Proceedings of the IEEE Conference on computer vision and pattern recognition*, pp. 472-480. 2017.
Zeiler, Matthew D., Dilip Kirshnan, Graham W. Taylor and Rob Fergus. "Deconvolutional networks." In *2010 IEEE Computer Society Conference on computer vision and pattern recognition*, pp. 2528-2535. IEEE, 2010.

* cited by examiner

FAST INDEXING WITH GRAPHS AND COMPACT REGRESSION CODES ON ONLINE SOCIAL NETWORKS

PRIORITY

This application claims the benefit, under 35 U.S.C. § 119(e), of U.S. Provisional Patent Application No. 62/597,012, filed 11 Dec. 2017, which is incorporated herein by reference.

TECHNICAL FIELD

This disclosure generally relates to databases and file management within network environments, and in particular relates to performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may perform a similarity search for content objects in response to a user query. Similarity search approaches based on graph walks have recently attained outstanding speed-accuracy trade-offs, taking aside the memory requirements. In the embodiments disclosed herein, these approaches are revisited by considering, additionally, the memory constraint required to index billions of content objects (e.g., images) on a single server. In particular embodiments, the social-networking system may leverage a method, namely link and code (L&C), which is based both on graph traversal and compact representations for similarity search. The L&C method may encode the indexed vectors using quantization and exploit the graph structure to refine the similarity estimation. In essence, the L&C method may take the best of these two worlds: the search strategy is based on nested graphs, thereby providing high precision with a relatively small set of comparisons. At the same time, it may offer a significant memory compression. As a result, the L&C method may outperform the state of the art on operating points considering 64-128 bytes per vector, as demonstrated by the experimental results on two billion-scale public benchmarks. Although this disclosure describes particular methods for particular similarity searches in a particular manner, this disclosure contemplates any suitable method for any suitable similarity search in any suitable manner.

In particular embodiments, the social-networking system may receive a search query. The search query may comprise a query content object and one or more query constraints. The social-networking system may then generate a feature vector representing the query content object. In particular embodiments, the social-networking system may access a sparse graph comprising a plurality of nodes corresponding to a plurality of candidate content objects and a plurality of links connecting the nodes. A number of links connecting to any particular node may be less than a threshold number of links and each candidate content object may be represented by a compact code. In particular embodiments, the social-networking system may select an entry node from the plurality of nodes of the sparse graph. The social-networking system may then select, from the plurality of candidate content objects, one or more similar content objects with respect to the query content object. In particular embodiments, the one or more similar content objects may be iteratively selected by the following process. The social-networking system may first identify one or more linked nodes of the entry node. Each linked node may be connected to the entry node by a link. The social-networking system may then decompress, for each candidate content object corresponding to the linked node, the compact code representing the candidate content object to generate a feature vector representing the candidate content object. The social-networking system may then select, based on a comparison between the feature vector representing the query content object and the feature vectors representing the candidate content objects, zero or more similar content objects from the candidate content objects. The social-networking system may then determine, if a completion condition is satisfied for the selecting of the one or more similar content objects. The completion condition may be determined based on the one or more query constraints. Based on the determining, if the completion condition is satisfied, the social-networking system may then return the one or more selected similar content objects; if the completion condition is not satisfied, the social-networking system may then repeat the iterative selection by using a linked node corresponding to a most similar content object from the one or more linked nodes as the entry node. In particular embodiments, the social-networking system may further send, to a client system associated with a user, instructions for presenting one or more of the selected similar content objects responsive to receiving the search query.

Certain technical challenges exist for achieving the goal of similarity search based on graphs and codes. One technical challenge may include building a sparse graph that facilitates efficient search. The solution presented by the embodiments disclosed herein to address the above challenge is generating the links based on one or more machine-learning algorithms, because of which the number of links connecting to any particular node is less than a threshold number, thereby resulting in a sparse graph with links that are significantly less than traditional graphs. Another technical challenge may include reconstructing reliable feature vectors representing candidate content objects. The solution presented by the embodiments disclosed herein to address this challenge is a refinement and a regression codebook, which may leverage the graph connectivity and minimize the reconstruction error, thereby making the reconstructed feature vectors more accurately representing the candidate content objects.

Certain embodiments disclosed herein may provide one or more technical advantages. A technical advantage of the embodiments may include improving the tradeoff between memory and accuracy when performing similarity search because of limited memory footprints based on compact representations of candidate content objects and the utilization of a graph traversal strategy. Another technical advantage of the embodiments may include improving the diversity of selected candidate content objects during the similarity search as for an entry node in a cluster of the graph, the connected nodes include both short-range linked nodes (more similar to the entry node) and long-range linked nodes (less similar to the entry node). Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
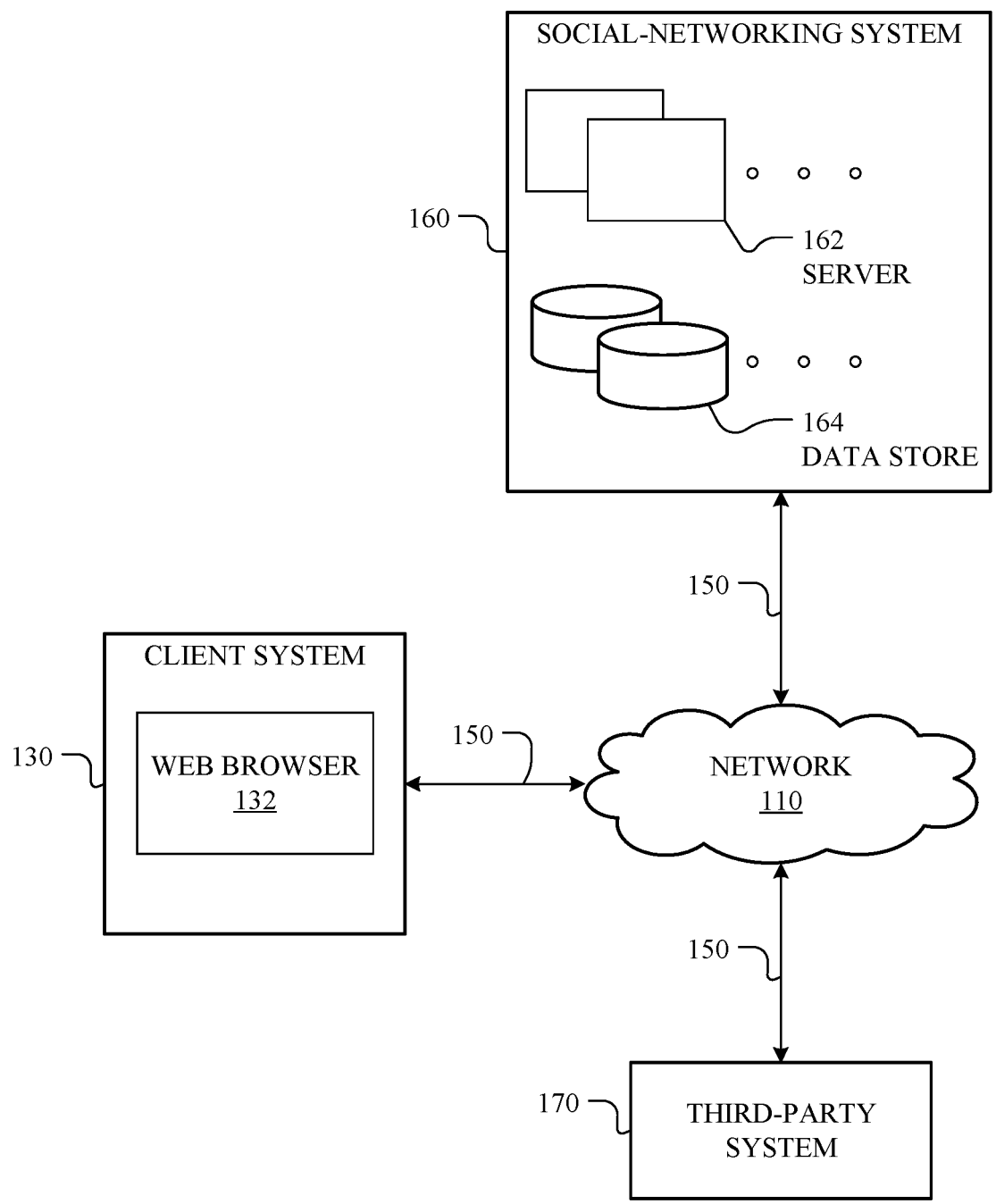
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Fast Indexing with Graphs and Compact Regression Codes on Online Social Networks In particular embodiments, the social-networking system 160 may perform a similarity search for content objects in response to a user query. Similarity search approaches based on graph walks have recently attained outstanding speed-accuracy trade-offs, taking aside the memory requirements. In the embodiments disclosed herein, these approaches are revisited by considering, additionally, the memory constraint required to index billions of content objects (e.g., images) on a single server. In particular embodiments, the social-networking system 160 may leverage a method, namely link and code (L&C), which is based both on graph traversal and compact representations for similarity search. The L&C method may encode the indexed vectors using quantization and exploit the graph structure to refine the similarity estimation. In essence, the L&C method may take the best of these two worlds: the search strategy is based on nested graphs, thereby providing high precision with a relatively small set of comparisons. At the same time, it may offer a significant memory compression. As a result, the L&C method may outperform the state of the art on operating points considering 64-128 bytes per vector, as demonstrated by the experimental results on two billion-scale public benchmarks. Although this disclosure describes particular methods for particular similarity searches in a particular manner, this disclosure contemplates any suitable method for any suitable similarity search in any suitable manner.

In particular embodiments, the social-networking system 160 may receive a search query. The search query may comprise a query content object and one or more query constraints. The social-networking system 160 may then generate a feature vector representing the query content object. In particular embodiments, the social-networking system 160 may access a sparse graph comprising a plurality of nodes corresponding to a plurality of candidate content objects and a plurality of links connecting the nodes. A number of links connecting to any particular node may be less than a threshold number of links and each candidate content object may be represented by a compact code. In particular embodiments, the social-networking system 160 may select an entry node from the plurality of nodes of the sparse graph. The social-networking system 160 may then select, from the plurality of candidate content objects, one or more similar content objects with respect to the query content object. In particular embodiments, the one or more similar content objects may be iteratively selected by the following process. The social-networking system 160 may first identify one or more linked nodes of the entry node. Each linked node may be connected to the entry node by a link. The social-networking system 160 may then decompress, for each candidate content object corresponding to the linked node, the compact code representing the candidate content object to generate a feature vector representing the candidate content object. The social-networking system 160 may then select, based on a comparison between the feature vector representing the query content object and the feature vectors representing the candidate content objects, zero or more similar content objects from the candidate content objects. The social-networking system 160 may then determine, if a completion condition is satisfied for the selecting of the one or more similar content objects. The completion condition may be determined based on the one or more query constraints. Based on the determining, if the completion condition is satisfied, the social-networking system 160 may then return the one or more selected similar content objects; if the completion condition is not satisfied, the social-networking system 160 may then repeat the iterative selection by using a linked node corresponding to a most similar content object from the one or more linked nodes as the entry node. In particular embodiments, the social-networking system 160 may further send, to a client system 130 associated with a user, instructions for presenting one or more of the selected similar content objects responsive to receiving the search query.

Introduction

Similarity search may be a key problem in large-scale search, such as, for example, searches in the domain of computer vision responsive to receiving a search query. It may be a core component of large-scale image search [32, 38], pooling [41] and semi-supervised low-shot classification [16]. Another example may comprise classification with a large number of classes [22]. In particular embodiments, the query content object in the search query may comprise one or more of a text, an audio clip, an image, or a video clip. The similarly search may then be performed within a large amount of candidate content objects. In the last few years, most of the recent work has focused on compact codes, either binary [10, 18] or based on various quantization methods [26, 11, 3, 44]. Employing a compact representation of vectors may be important when using local descriptors such as SIFT [31], since thousands of such vectors may be extracted per image. In this case the set of descriptors typically requires more memory than the compressed image itself. Having a compressed indexed representation employing 8-32 bytes per descriptor was a requirement driven by scalability and practical considerations.

However, the recent advances in visual description have mostly considered description schemes [37, 27, 19] for which each image is represented by a unique vector. In particular embodiments, the feature vector representing the query content object may be generated based on one or more machine-learning algorithms. The one or more machine-learning algorithms may be based on a convolution neural network. To be more specific, the vector is typically extracted from the activation layers of a convolutional neural network [5, 42]. The state of the art in image retrieval learns the representation end-to-end [20, 39] such that cosine similarity or Euclidean distance reflects the semantic similarity. The resulting image descriptors consist of no more than a few hundred components.

In particular embodiments, the search query may be associated with one or more query constraints. The one or more query constraints may comprise one or more of a memory utilization or CPU utilization constraint, a selection accuracy constraint, a search-query processing time constraint, any suitable constraint, or any combination thereof. In this context, it may be worth investigating approaches for nearest neighbor search trading memory for a better accuracy and/or efficiency. An image representation of 128 bytes may be acceptable in many situations, as it is comparable if not smaller than the meta-data associated with it and stored in a database. While some conventional work argues that the performance saturates beyond 16 bytes [8], the best results achieved with 16 bytes on the Deep10M and Deep1B datasets (i.e., two public datasets) do not exceed 50% recall at rank 1 [7, 15]. While going back to the original vectors may improve the recall, it may require accessing a slower storage device, which may be detrimental to the overall efficiency.

In contrast, some methods like those implemented in FLANN [35] consider much smaller datasets and target high-accuracy and throughput. The state-of-the-art methods implemented in NMSLIB [9] focuses solely on the compromise between speed and accuracy. They do not include any memory constraint in their evaluation and compare methods only on small datasets comprising a few millions of vectors at most. Noticeably, the successful approach by Malkov et al. [33, 34] requires both the original vectors and a full graph structure linking vectors. This memory requirement severely limits the scalability of this class of approaches, which may have never been scaled up to a billion vectors.

These two points of views, namely compressed-domain search and graph-based exploration, consider extreme sides of the spectrum of operating points with respect to memory requirements. While memory compactness may have an obvious practical advantage regarding scalability, HNSW (Hierarchical Navigable Small Worlds [33, 34]) is significantly better than the Inverted Multi-Index (IMI) [6] in terms of the compromise between accuracy and the number of elementary vector comparisons, thanks to the effective graph walk that rapidly converges to the nearest neighbors of a given query.

The embodiments disclosed herein aim at conciliating these two trends in similarity search by proposing a solution that scales to a billion vectors, thanks to a limited memory footprint, and that offers a good accuracy/speed trade-off offered by a graph traversal strategy. For this purpose, the L&C method may represent each indexed vector by i) a compact representation based on the optimized product quantization (OPQ) [17], and ii) refining it by a novel quantized regression from neighbors. This refinement may exploit the graph connectivity and only require a few bytes by vector. The L&C method may learn a regression codebook by alternate optimization to minimize the reconstruction error. As a result, the embodiments disclosed herein may have a technical advantage of improving the tradeoff between memory and accuracy when performing similarity search because of limited memory footprints based on compact representations of candidate content objects and the utilization of a graph traversal strategy.

Figure 2:
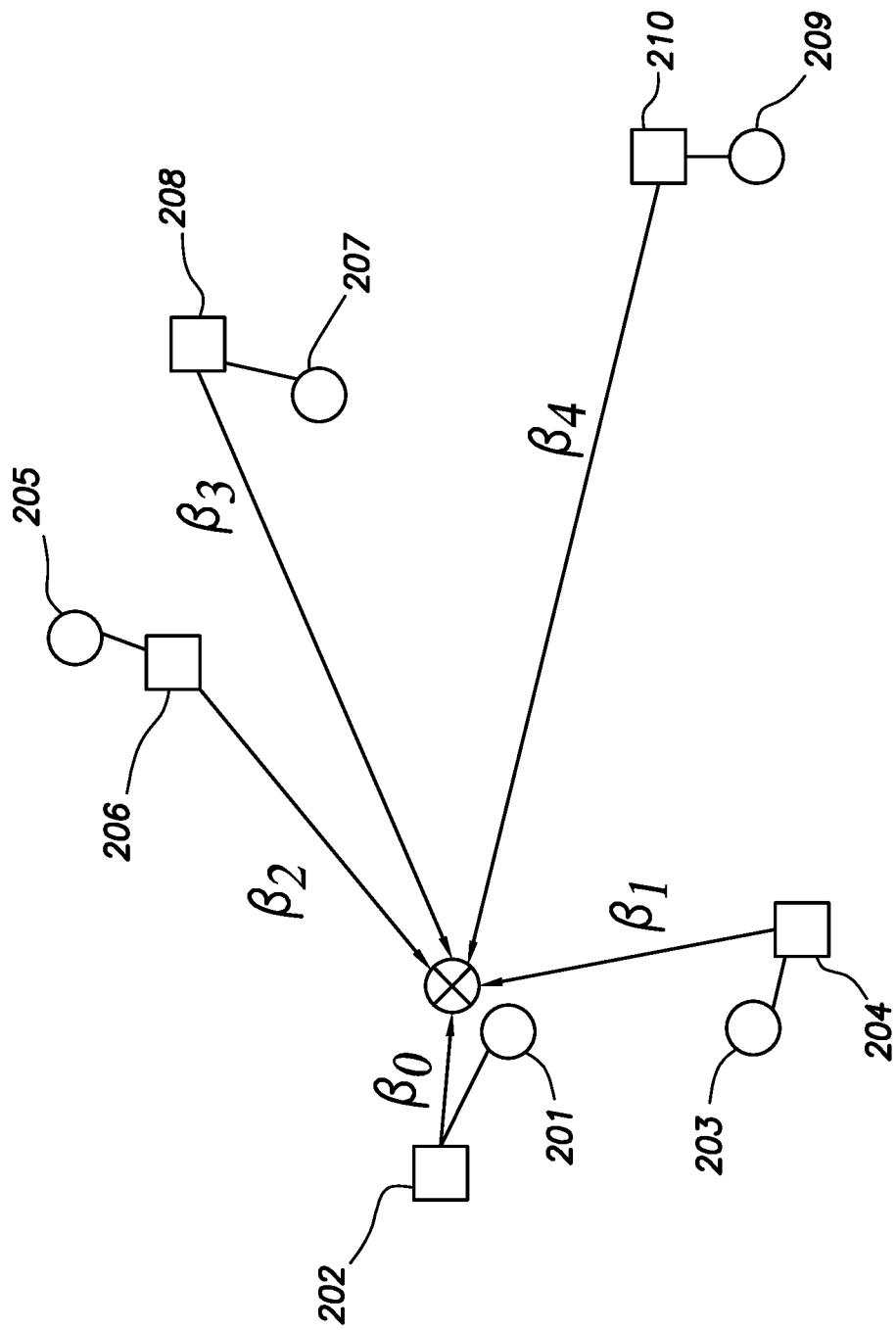
FIG. 2 illustrates an example visualization of the L&C method.

FIG. 2 illustrates an example visualization of the L&C method. In particular embodiments, a graph traversal strategy that maintains a connectivity between all database points may be adopted. The L&C method may be based on compressed descriptors to save memory: each database vector (indicated by a circle in FIG. 2) may be approximated (indicated by a square in FIG. 2) with quantization. For example, vectors 201, 203, 205, 207, and 209 are approximated by quantization 202, 204, 206, 208, and 210, respectively. In particular embodiments, the estimate may be further improved by regressing each database vector from its encoded neighbors, which may provide an excellent representation basis. The regression coefficients $\beta=[\beta_0, \ldots, \beta_K]$ may be selected from a codebook learned to minimize the vector reconstruction error.

The contributions of the embodiments disclosed herein may comprise a preliminary analysis evaluating different hypotheses, and an indexing method employing a graph structure and compact codes. Specifically, The embodiments disclosed herein show that using a coarse centroid may provide a better approximation of a descriptor than its nearest neighbor in a typical setting, suggesting that the first approximation of a vector should be a centroid rather than another point of the dataset [8]. The embodiments disclosed herein also show that a vector may be better approximated by a linear combination of a small set of its neighbors, with fixed mixing weights obtained by a close-form equation. This estimator may be further improved if the weights can be stored on a per-vector basis.

The embodiments disclosed herein show that HNSW may offer a much better selectivity than a competitive method based on inverted lists. This may favor HNSW for large representations, as opposed to the case of very short codes (8-16 bytes).

The embodiments disclosed herein introduce a graph-based similarity search method with compact codes and quantized regression from neighbors. It achieves state-of-the-art performance on billion-sized benchmarks for the high-accuracy regime.

Related Work

Consider a set of N elements $X=\{x_1, \ldots, x_N\} \subset \Omega$ and a distance $d: \Omega \times \Omega \to R$ (or similarity), the embodiments disclosed herein tackle the problem of finding the nearest neighbors $N_x(y) \subset X$ of a query $y \in \Omega$, i.e., the elements $\{x\}$ of X minimizing the distance $d(y,x)$ (or maximizing the similarity, respectively). The embodiments disclosed herein routinely consider the case $\Omega=R^d$ and $d=l_2$, which may be of high interest in computer vision applications.

Somehow reminiscent of the research field of compression in the 90s, for which a rapid shift from lossless to lossy compression has been witnessed, the recent research effort in this area has focused on approximate near- or nearest neighbor search [24, 23, 14, 26, 18, 6], in which the guarantee of exactness is traded against high efficiency gains.

Approximate methods typically improve the efficiency by restricting the distance evaluation to a subset of elements, which are selected based on a locality criterion induced by a space partition. For instance, Locality Sensitive Hashing (LSH) schemes [12, 1] exploit the hashing properties resulting from the Johnson-Lindenstrauss lemma. Errors occur if a true positive is not part of the selected subset.

Another source of approximation results from compressed representations, which were pioneered by Weber et al. [43] to improve search efficiency [43]. Subsequently the seminal work [10] of Charikar on sketches has popularized compact binary codes as a scalability enabler [25, 32]. In these works, and subsequent ones employing vector quantization [26], errors are induced by the approximation of the distance, which results in swapped elements in the sorted result lists. Typically, a vector is reduced by principal component analysis (PCA) dimensionality reduction followed by some form of quantization, such as scalar quantization [40], binary quantization [21] and product quantization or its variants [26, 17]. Recent similarity search methods often combine these two approximate and complementary strategies, as initially proposed by Jégou et al. [26]. The quantization is hierarchical, i.e., a first-level quantizer produces an approximate version of the vector, and an additional code refines this approximation [28, 3].

The IVFADC method of [26] and IMI [6] are representative search algorithms employing two quantization levels. All the codes having the same first-level quantization code are stored in a contiguous array, referred to as an inverted list, which is scanned sequentially. Ann Arbor [8] encodes the vectors w.r.t. a fixed set of nearest vectors. The embodiments disclosed herein show that this choice may be detrimental, and that learning the set of anchor vectors may be necessary to reach a good accuracy.

Graph-Based Approaches.

Unlike approaches based on space partitioning, the inspirational NN-descent algorithm [13] builds a knn-graph to solve the all-neighbors problem: the goal is to find the k nearest neighbors in X, w.r.t. d, for each $x \in X$. The search procedure proceeds by local updates and is not exhaustive, i.e., the algorithm converges without considering all pairs (x, x')$\in X^2$. The NN-decent algorithm has also been considered for the approximate nearest neighbor search.

Yuri Malkov et al. [33, 34] introduced the most accomplished version of the NN-decent algorithm, namely HNSW. This solution selects a series of nested subsets of database vectors, or "layers". The first layer contains only a single point, and the base layer is the whole dataset. The sizes of the layers follow a geometric progression, but they are otherwise sampled randomly. For each of these layers HNSW constructs a neighborhood graph. The search starts from the first layer. A greedy search is performed on the layer until it reaches the nearest neighbor of the query within this layer. That vector is used as an entry point in the next layer as a seed point to perform the search again. At the base layer, which consists of all points, the procedure differs: a bread first search starting at the seed produces the resulting neighbors It is important that the graph associated with each subset is not the exact knn-graph of this subset: long-range edges should be included. This is akin to simulated annealing or other diversification techniques in optimization: a fraction of the evaluated elements should be far away. In HNSW, this diversification is provided in a natural way, thanks to the long-range links enforced by the upper levels of the structure, which are built on fewer points. However, this is not sufficient, which led Malkov et al. to design a "shrinking" operator that reduces a list of neighbors for a vector in a way that does not necessarily keeps the nearest ones.

Preliminary Analysis

This section presents several studies that have guided the design of the embodiments disclosed herein. All these evaluations are performed on $X=Deep1M \subset R^{96}$, i.e., the first million images of the Deep1B dataset [7].

In particular embodiments, a comparison between the graph-based traversal of HNSW and the clustering-based hashing scheme employed in IMI is carried out first. The goal is to measure how effective a method is at identifying a subset containing neighbors with a minimum number of comparisons. The second analysis considers different estimators of a vector to best approximate it under certain assumptions, including cases where an oracle provides additional information such as the neighbors. Finally, a comparative evaluation of different methods for encoding the descriptors in a compact form is carried out, assuming that exhaustive search with approximate representations is possible. This leads to the identification of appealing choices for the target operating points.

i Selectivity: HNSW Versus IMI

In particular embodiments, two popular approaches are considered for identifying a subset of elements, namely the multi-scale graph traversal of HNSW [34] and the space partitioning employed in IMI [6], which relies on a product quantizer [26]. Both methods consist of (i) an identification stage, where the query vector is compared with a relatively small set of vectors (centroids or upper level in HNSW); and (ii) a comparison stage, in which most of the actual distance evaluations are performed. For a more direct comparison, the exact distances are computed between vectors. The tradeoff between accuracy and the number of distance calculations is measured. This is linearly related to selectivity: this metric [36] measures the fraction of elements that must be looked up.

Figure 3:
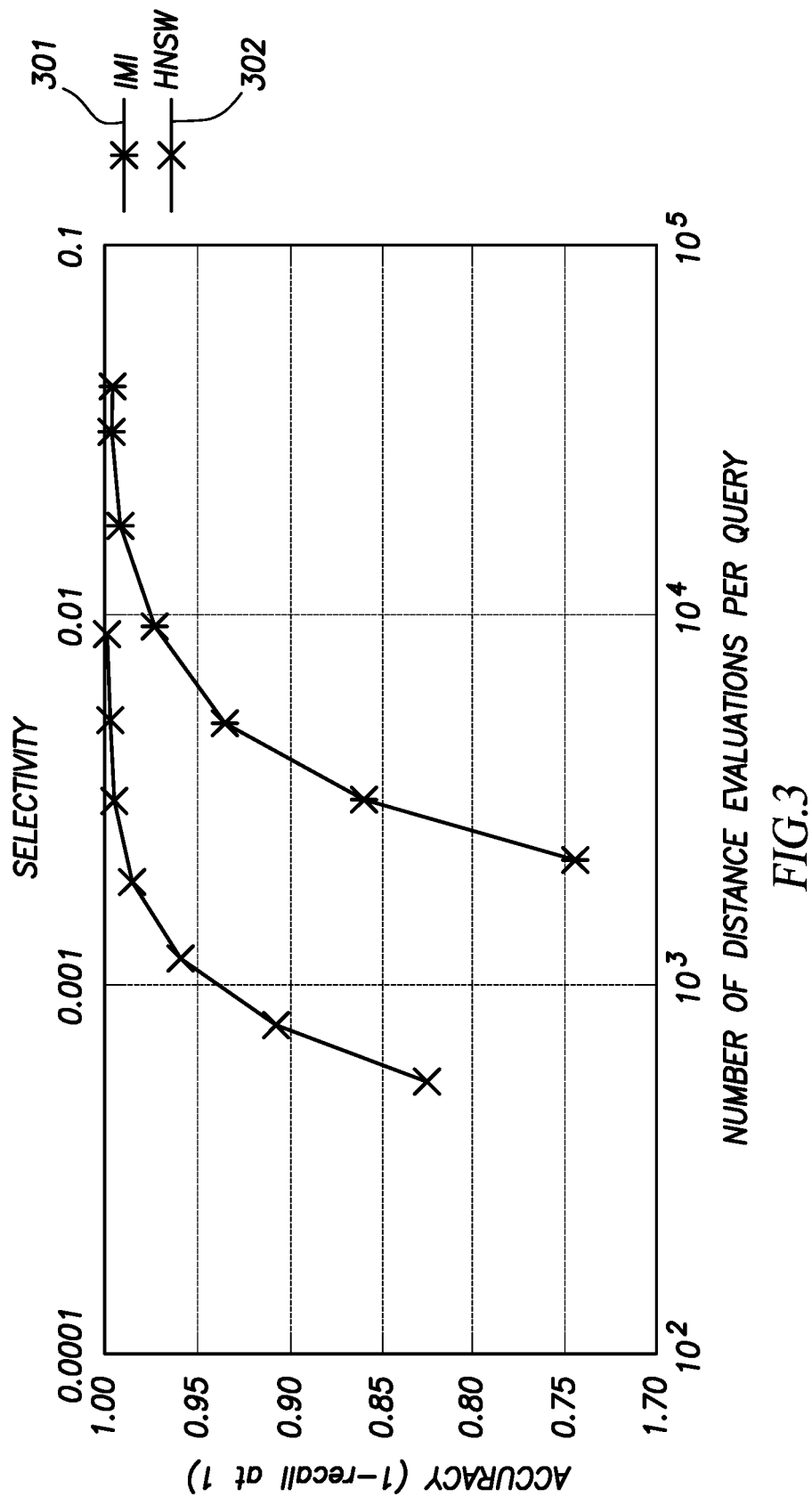
FIG. 3 illustrates an example accuracy variation w.r.t. selectivity.
Figure 4:
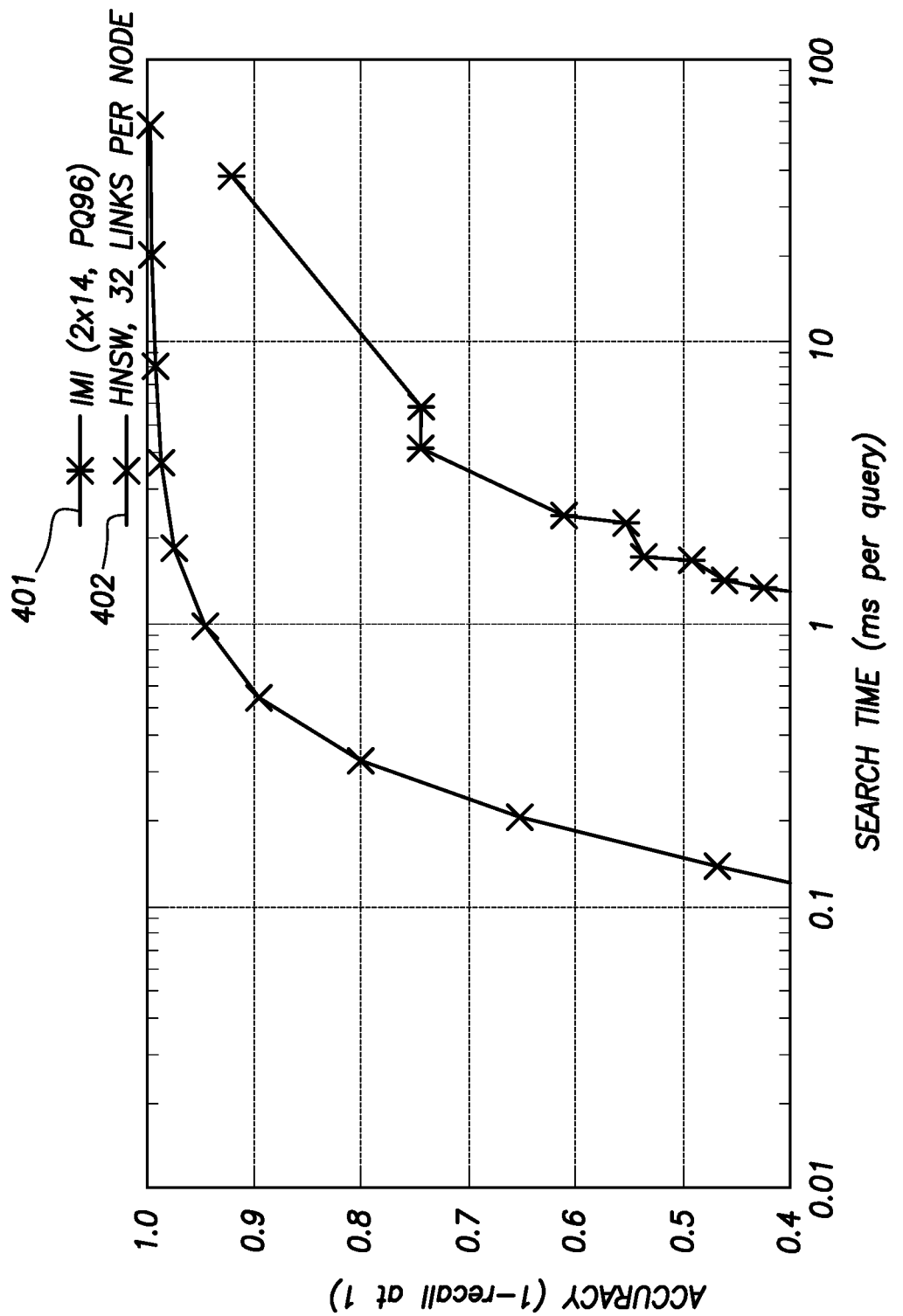
FIG. 4 illustrates an example trade-off between accuracy and speed.

Standard settings are selected for this setup: for IMI, 2 codebooks of $2^{10}$ centroids are used, resulting in about 1M (million) inverted lists. For HNSW, 64 neighbors on the base layer and 32 neighbors on the other ones are used. During the refinement stage, both methods perform code comparisons starting from most promising candidates and store the k best search results. The number of comparisons after which the search is stopped is a search-time parameter T in both methods. FIG. 3 illustrates an example accuracy variation w.r.t. selectivity. In FIG. 3, the accuracy is illustrated as a function of the number of distance computations performed for two methods, i.e., IMI 301 and HNSW 302. The plot shows that HNSW 302 is 5 to 8 times more selective than IMI 301 for a desired level of accuracy. This better selectivity may not directly translate to the same speed-up because HNSW 302 requires many random probes from main memory, as opposed to contiguous inverted lists. Yet this shows that HNSW 302 may become invariably better than IMI 301 for larger vector representations, when the penalty of random accesses does not dominate the search time anymore. FIG. 4 illustrates an example trade-off between accuracy and speed. In FIG. 4, the trade-off is shown for two methods, i.e., IMI 401 and HNSW 402 on mid-sized dataset (Deep100M). Both methods use 96-byte encodings of descriptors. FIG. 4 confirms that HNSW 402 with a scalar quantizer is faster and more accurate than an IMI 401 employing very fine quantizers at both levels. However, this requires 224 bytes per vector, which translates to 50 GB in RAM when including all overheads of the data structure.

ii Centroids, Neighbor or Regression?

Hereafter several ways of getting a coarse approximation of a vector $x \in X$ are investigated. In particular embodiments, some of these estimations may depend on additional information, for example when it is assumed that all other vertices of a given database vector x are available. They are reported as topline results for the sake of the study disclosed herein.

Centroid.

In particular embodiments, a coarse codebook C comprising 16k elements may be learned by k-means. It may be learned either directly on X or using a distinct training set of 1 million vectors. x may be approximated by its nearest neighbor $q(x) \in C$.

Nearest Neighbor.

It may be assumed that the nearest neighbor $n_1(x)$ of x is known and it can be used as an approximation. This choice shows the upper bound of what the searching algorithm can achieve by selecting a single vector in X.

Weighted Average.

Here it may be assumed that the k=8 nearest neighbors of x ordered by decreasing distances are accessible, stored in matrix form as $N(x)=[n_1, \ldots, n_k]$ x may be estimated as the weighted average $$\underline{x}=\beta^{*T}N(x), \quad (1)$$

wherein $\beta^*$ is a fixed weight vector constant shared by all elements in X. The close-form computation of $\beta^*$ is detailed later.

Regression.

Again, N(x) may be used to estimate x, but it may be additionally assumed that the optimal regression coefficients $\beta(x)$ minimizing the reconstruction error of x is perfectly known. In other words, the following equation is computed $$\hat{x}=\beta(x)^T N(x), \quad (2)$$

wherein $\beta(x)$ is obtained as the least-square minimizer of the over-determined system $\|x-\beta(x)^T N(x)\|^2$.

Figure 5:
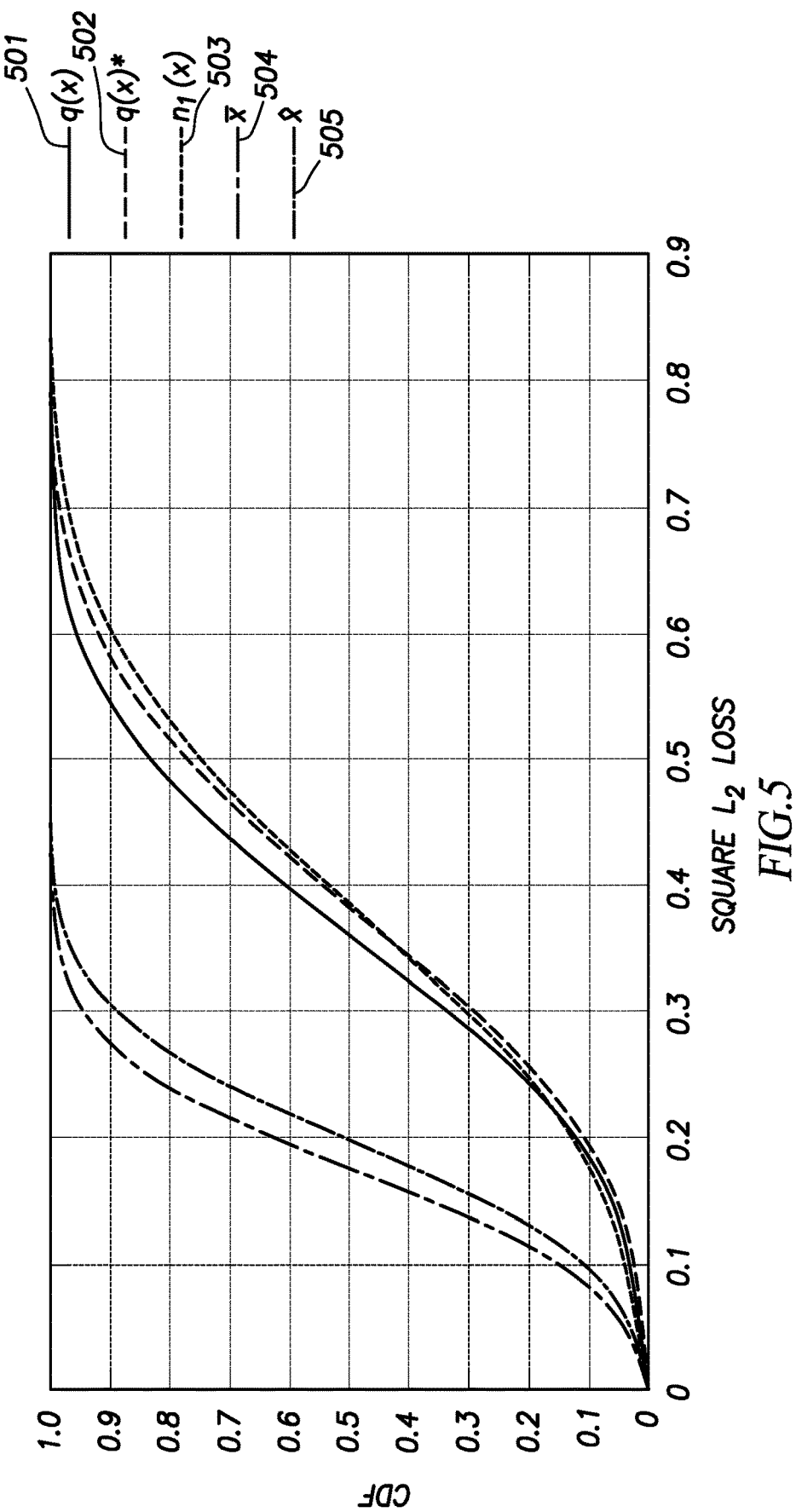
FIG. 5 illustrates an example distribution of the error for different estimator.

FIG. 5 illustrates an example distribution of the error for different estimators. The error is measured by square Euclidean distance based on cumulative probability mass function of the square loss for different estimators of $x \cdot q(x)$ 501 indicates the closest centroid from a codebook learned on X or $q(x)^*$ 502 which is a distinct set; $n_1(x)$ 503 indicates nearest neighbor in X; $\underline{x}$ 504 indicates weighted average of 8 neighbors; $\hat{x}$ 505 indicates the best estimator from its 8 nearest neighbors. According to FIG. 5, several observations may be drawn. First, choosing the centroid q(x) 501 in a codebook of 16k vectors may be comparatively more effective than taking the nearest neighbor $n_1(x)$ 503 amongst the 64× larger set X of 1 million vectors. Therefore, using vectors of the HNSW upper level graph as reference points to compute a residual vector may be not an interesting strategy. Second, if the connectivity is granted for free or required by design like in HNSW, the performance achieved by $\underline{x}$ 504 may suggest that the estimation of x from its neighbors may be improved with no extra storage, if there is a reasonable approximation of N(x). Third, under the same hypotheses and assuming additionally that the parameter β(x) for all x is available, a better estimator may be obtained with equation (2). This observation may be the key to the re-ranking strategy introduced in the embodiments disclosed herein.

iii Coding Method: First Approximation

In particular embodiments, which vector compression is most accurate per se is evaluated to perform an initial search given a memory budget. Many studies of this kind focus on very compact codes, like 8 or 16 bytes per vector. The embodiments disclosed herein are interested in higher-accuracy operating points. Additionally, the results are often reported for systems parametrized by several factors (shortlist, number of probes, etc.), which makes it difficult to separate the false negatives induced by the coding from those resulting from the search procedure.

To circumvent this comparison issue, the database vectors are compressed and decompressed, and an exhaustive search is performed. All experiments in Table 1 are performed on Deep1M (the 1M first images of the Deep1B dataset). The percentage of queries is reported, for which the nearest neighbor is among the top1 (respectively top10) results. The results of Ann Arbor [8] in Table 1 depends on a parenthood link (4 bytes). The codebooks are trained on the provided distinct training set. In particular, product quantization (PQ [26]) and optimized product quantizer (OPQ [17]) are considered. A notation of the form PQ16×8 or OPQ14×2 is adopted, in which the values respectively indicate the number of codebooks and the number of bits per sub-quantizer.

TABLE 1

HNSW: Exhaustive search in 1M vectors in 96D with different coding methods.

| codec | size (bytes) | accuracy recall@1 | recall@10 |
|---|---|---|---|
| none | 384 | 1.000 | 1.000 |
| scalar quantizer | 96 | 0.978 | 1.000 |
| PQ16 × 8 | 16 | 0.335 | 0.818 |
| PQ8 × 16 | 16 | 0.394 | 0.881 |
| PQ2 × 8 + OPQ14 × 8 | 16 | 0.375 | 0.867 |
| PQ1 × 16 + OPQ14 × 8 | 16 | 0.422 | 0.899 |
| PQ2 × 16 + OPQ12 × 8 | 16 | 0.421 | 0.904 |
| PQ2 × 12 + OPQ13 × 8 | 16 | 0.382 | 0.870 |
| AnnArbor [8] (*) | 16 | 0.421 | |
| OPQ32 × 8 | 32 | 0.604 | 0.982 |
| PQ1 × 16 + OPQ30 × 8 | 32 | 0.731 | 0.997 |
| PQ2 × 16 + OPQ28 × 8 | 32 | 0.713 | 0.996 |
| PQ2 × 14 + OPQ28 × 8 | 32 | 0.693 | 0.995 |
| PCA8 | 32 | 0.017 | 0.074 |

Additionally, a combination of quantizers exploiting residual vectors is considered to achieve higher-accuracy performance. In this case, a 2-level residual codec is considered, in which the first level is either a vector quantizer with 65536 centroids (denoted PQ1×16 in the notation used herein) or a product quantizer (PQ2×12 or PQ2×14). What remains of the memory budget is used to store a OPQ code for the refinement codec, which encodes the residual vector. Note that IVFADC-based methods and variants like IMI exploit 2-level codecs. Only the data structure differs.

The results show that 2-level codecs are more accurate than 1-level codecs. They are also more computationally expensive to decode. For operating points of 32 bytes, it is observed that just reducing the vectors by PCA or encoding them with a scalar quantizer is sub-optimal in terms of accuracy. Using OPQ gives a much higher accuracy. Thanks to the search based on table lookups, it is also faster than a scalar quantizer in typical settings. For comparison with the Ann Arbor method, a few results on 16 bytes per vector are also reported. The same conclusions hold: a simple 2-level codec with 65536 centroids (e.g., PQ1×16+OPQ14×8) gets the same codec performance as Ann Arbor.

Link and Code Approach

This section discloses the L&C method. It may offer a state-of-the-art compromise between approaches considering very short codes (8-32 bytes) and those not considering the memory constraint, like FLANN and HNSW. After presenting an overview of the indexing structure and search procedure, how to improve the reconstruction of an indexed vector from its approximate neighbors with no additional memory is shown. Then a novel refinement procedure with quantized regression coefficients and details of the optimization procedure used to learn the regression codebook are introduced. Finally, an analysis to discuss the trade-off between connectivity and coding, when fixing the memory footprint per vector, is conducted.

i Overview of the Index and Search

Vector Approximation.

In particular embodiments, the compact code for each candidate content object may be generated based on one or more encodings. The one or more encodings may comprise one or more of a product quantizer or an optimized product quantizer. In other words, all indexed vectors may be first compressed with a coding method independent of the structure. It is a quantizer, which may formally map any vector $x \in R^d \mapsto q(x) \in C$, where C is a finite subset of $R^d$, meaning that $q(x)$ is stored as a code. Following the findings of Section Preliminary Analysis, two-level encodings are adopted for all experiments. For the first level, a product quantizer of size 2×12 or 2×14 bits (PQ2×12 and PQ2β×14) is chosen, which may be cheaper to compute. For the second level, OPQ with codes of arbitrary length is used.

Graph-Based Structure.

In particular embodiments, the HSNW indexing structure (i.e., a sparse graph) may be adopted, except that it may be modified so that it works with the coded vectors disclosed herein. More precisely, all vectors may be stored in coded format, but the add and query operations may be performed using asymmetric distance computations [26]: the query or vector to insert is not quantized, only the elements already indexed are. In particular embodiments, the plurality of links of the sparse graph may be generated by one or more machine-learning algorithms. Generating the links based on one or more machine-learning algorithms may be an effective solution for addressing the technical challenge of building a sparse graph that facilitates efficient search, because the number of links connecting to any particular node generated by the machine-learning algorithms is less than a threshold number, thereby resulting in a sparse graph with links that are significantly less than traditional graphs. In particular embodiments, the degree of the graphs may be fixed at the upper levels to k=32, and the size ratio between two graph levels may be fixed at 30, i.e., there are 30× fewer elements in the graph level 1 than in the graph level 0.

In particular embodiments, each node in the sparse graph may be associated with a cluster of candidate content objects. The cluster may comprise more than one single candidate content object. Each cluster may be associated with a feature vector. In particular embodiments, selecting the entry node from the plurality of nodes of the sparse graph may comprise selecting the entry node based on a comparison between the feature vector representing the query content object and the feature vectors representing the clusters of candidate content objects. In particular embodiments, the one or more linked nodes of the entry node may comprise one or more short-range linked nodes and at least one long-range linked node. Each of the one or more short-range linked nodes may have a similarity-level greater than or equal to a threshold level with respect to the entry node. In particular embodiments, the at least one long-range linked node may have a similarity-level less than a threshold level with respect to the entry node. As a result, the embodiments disclosed herein may have a technical advantage of improving the diversity of selected candidate content objects during the similarity search as for an entry node in a cluster of the graph, the connected nodes include both short-range linked nodes (more similar to the entry node) and long-range linked nodes (less similar to the entry node).

Refinement Strategy.

In particular embodiments, a two-stage search strategy [28] may be adopted. During the first stage, selecting a short-list of potential neighbor candidates may be solely relied on the first approximation induced by q(•). The indexed vectors may be reconstructed on-the-fly from their compact codes. The second stage may require more computation per vector and may be applied only on this short-list to re-rank the candidates. In particular embodiments, two variants for this refinement procedure may be used. The first variant may comprise 0-byte refinement which does not require any additional storage per vector. It may be performed by re-estimating the candidate element from its connected neighbors encoded with q (x). Another variant may comprise refining the vector approximation by using a set of quantized regression coefficients stored for each vector. These coefficients may be learned and selected for each indexed vector offline, at building time. In particular embodiments, decompressing the compact code representing each candidate content objects may be based on one or more of: a refinement based on the compact code representing the candidate content object and one or more compact codes associated with one or more linked nodes of the node corresponding to the candidate content object (i.e., the first variant mentioned above); or the compact code representing the candidate content object and a regression codebook comprising a plurality of regression weight vectors (i.e., the second variant mentioned above). The refinement and the regression codebook, which may leverage the graph connectivity and minimize the reconstruction error may be effective solutions for addressing the technical challenge of reconstructing reliable feature vectors representing candidate content objects, as they make the reconstructed feature vectors more accurately representing the candidate content objects.

ii 0-Byte Refinement

In particular embodiments, the refinement may be based on one or more loss functions. The one or more loss functions may associate the feature vector representing the candidate content object and a code matrix associated with the candidate content object. The code matrix may comprise the compact code representing the candidate content object and the compact codes associated with the linked nodes of the node corresponding to the candidate content object. To be more specific, each indexed vector x may be connected in the graph to a set of k other vectors, $g_1(x), \ldots, g_k(x)$, ordered by increasing distance to x. This set may include some of the nearest neighbors of x, but not necessarily. From their codes, x may be reconstructed as q(x) and each $g_i$ may be reconstructed as $q(g_i(x))$. In particular embodiments, the matrix G(x) may be defined as $G(x)=[q(x), q(g_1(x)), \ldots, q(g_k(x))]$ stacking the reconstructed vectors. The objective may comprise using this matrix to design a better estimator of x than q(x), i.e., to minimize the expected square reconstruction loss. For this purpose, the empirical loss may be minimized as $$L(\beta)=\Sigma_{x \in X}\|x-\beta^T G(x)\|^2 \qquad (3)$$

over X. Note that, considering the small set of k+1 parameters, using a subset of X may not make any difference in practice. In particular embodiments, the vertically concatenated vector and matrix may be defined as $$X = \begin{bmatrix} x_1 \\ \vdots \\ x_N \end{bmatrix} \text{ and } Y = \begin{bmatrix} G(x_1) \\ \vdots \\ G(x_N) \end{bmatrix} \qquad (4)$$

and $L(\beta)=\|X-\beta^T Y\|^2$. This may be a regular least-square problem with a closed-form solution $\beta^*=Y^*X$, wherein $Y^*$ is the Moore-Penrose pseudo-inverse of Y. In particular embodiments, the minimizer $\beta^*$ may be computed with a standard regressor. This regression weights may be shared by all index elements, and therefore may not involve any per-vector code. An indexed vector may be refined from the compact codes associated with x and its connected vectors as $$\underline{x}=\beta^{*T}G(x). \qquad (5)$$

In expectation and by design, $\underline{x}$ may be a better approximation of x than q(x), i.e., it may reduce the quantization error. It is interesting to look at the weight coefficient in $\beta^*$ corresponding to the vector q(x), in the final approximation. It can be as small as 0.5 if the quantizer is very coarse: in this situation the quantization error may be large and it may be significantly reduced by exploiting the neighbors. In contrast, if the quantization error is limited, the weight is typically 0.9.

iii Regression Codebook

In particular embodiments, the disclosed 0-byte refinement step may be granted for free, given that a graph connecting each indexed element with nearby points is accessible. As discussed previously, a vector x may be better approximated from its neighbors if the optimal regression coefficients are known. This may require storing them on a per-vector basis, which may increase the memory footprint per vector by 4×k bytes with floating-point values. In order to limit the additional memory overhead, a method may be used to learn a code-book $B=\{\beta_1, \ldots, \beta_B\}$ of regression weight vectors, which is disclosed as follows. In particular embodiments, the regression codebook may be learned based on the plurality of candidate content objects and one or more loss functions. The regression codebook may comprise a set of quantized regression coefficients for each candidate content object. In particular embodiments, generating the feature vector representing each candidate content object may be further based on the set of quantized regression coefficients. In particular, the objective may comprise minimizing the empirical loss $$L'(\beta) = \sum_{x \in X} \|x - \beta^T G(x)\|^2. \qquad (6)$$

Performing a k-means directly on regression weight vectors may optimize the $l_2$-reconstruction of the regression vector β(x), but not of the loss in equation (6). In particular embodiments, k-means only may be used to initialize the regression codebook. Then an EM-like algorithm may be used alternating over the two following steps.

1. Assignment. Each vector x may be assigned to the code-book element minimizing its reconstruction error:

$$\beta(x) = \text{argarg} \|x - \beta^T G(x)\|^2 \quad (7)$$

2. Update. For each cluster conveniently identified by $\beta_i$, the optimal regression weights may be determined as $$\beta_i^* = \text{argarg}^2 \quad (8)$$

and update $\beta_i \leftarrow \beta_i^*$ accordingly. For a given cluster, equation (8) may be the same as the one of equation (3), except that the solution may be computed only over the subset of vectors assigned to $\beta_i$. It may be closed-form as discussed earlier.

In practice, as B is relatively small (B=256), only a subset of X may be needed to learn a representative codebook B. This refinement stage may require 1 byte per indexed vector to store the selected weight vector from the codebook B.

Product Codebook.

As shown later in the experiments, the performance improvement brought by this regression codebook may be worth the extra memory per vector. However, the performance may rapidly saturate with the increase of the codebook size B. This may be expected because the estimator $\beta(x)^T G(x)$ only spans a (k+1)-dimensional subspace of $R^d$, k≪d. Therefore, the projection of x lying in the null space ker(G) cannot be recovered.

In particular embodiments, this problem may be circumvented by adopting a strategy inspired by product quantization [26]. In particular embodiments, each vector may be evenly split as $x=[x^1; \ldots, x^M]$, wherein each $x^j \in R^{d/M}$, and a product regression codebook $B^1 \times \ldots \times B^M$, i.e., one codebook per subspace, may be learned. In this case, extending the superscript notation to β and G, the vector may be estimated as $$\hat{x} = [\beta^1(x^1) G^1(x), \ldots, \beta^M(x^M) G^M(x)]. \quad (9)$$

wherein $\forall j$, $\beta^j(x^j) \in B^j$. The set of possible estimators may span a subspace having to up M×k dimensions. This refinement method may require Mbytes per vector.

iv L&C: Memory/Accuracy Tradeoffs

As discussed earlier, HNSW method may be both the fastest and most accurate indexing method at the time being, but its scalability may be restricted by its high memory usage. For this reason, it has never been demonstrated to work at a billion-scale. In this subsection, the L&C method is analyzed when imposing a fixed memory budget per vector. Three factors may contribute to the marginal memory footprint:
- the code used for the initial vector approximation, for instance OPQ32 (32 bytes);
- the number k of graph links per vector (4 bytes per link);
- [optionally] the Mbytes used by the refinement method from neighbors with a product regression codebook.

L&C Notation.

To identify unambiguously the parameter setting, a notation of the form L6&OPQ40 is adopted. L6 indicates that 6 links per vector are used in the graph and OPQ40 indicates that the vector is first encoded with OPQ, allocating 40 bytes per vector. If, optionally, a regression codebook is used, it is referred to by the notation M=4 in tables and figures. The case of 0-coding is denoted by M=0.

Coding Vs Linking.

Figure 6:
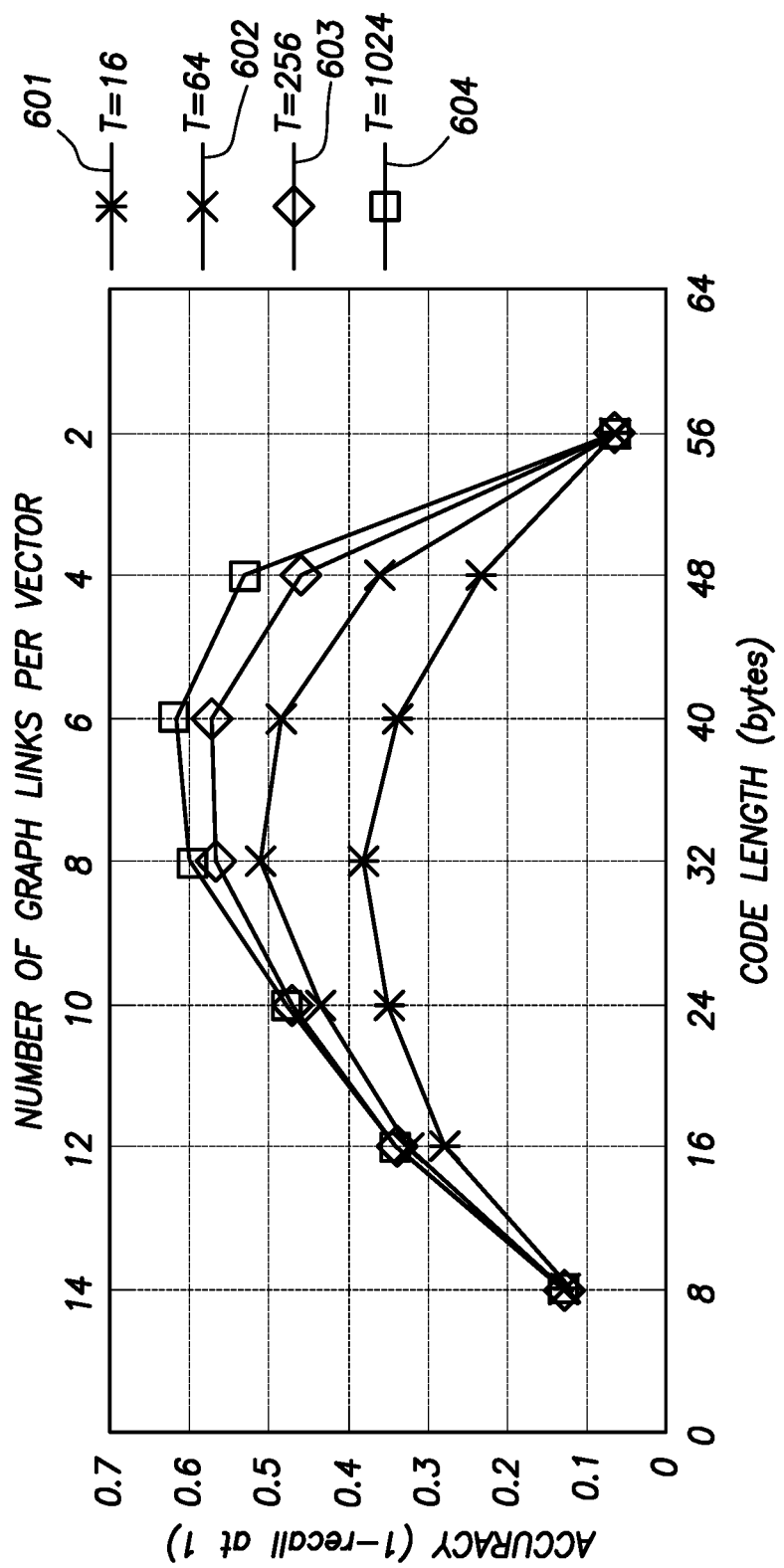
FIG. 6 illustrates an example performance variation depending on whether a fixed memory budge of 64 bytes is allocated to codes (QPQ codes of varying size) or links.

In particular embodiments, the compromise between the number of links and the number of bytes allocated to the compression codec may be first considered. FIG. 6 illustrates an example performance variation depending on whether a fixed memory budge of 64 bytes is allocated to codes (QPQ codes of varying size) or links. The performance variation is based on an experiment where it is started from the full HNSW representation and then either the number of links or the number of dimensions stored for the vectors is gradually reduced. In this experiment, all setups reaching the same budget of 64 bytes are considered, and results for several choices of the parameter T are reported. For example, T equals to 16, 64, 256, and 1024, which are indicated by 601, 602, 603, and 604, respectively. Recall that T is the parameter capping the number of distance evaluations, which controls the total number of comparisons. In particular embodiments, the parameter T may be associated with the completion condition of the iterative selection of similar content objects. The completion condition may be determined based on the one or more query constraints. Based on FIG. 6, it may be observed that there is a clear trade-off enforced by the memory constraint. The search may be ineffective with too few links, as the algorithm cannot reach all points. At the opposite side, the accuracy may be also impacted by a too strong approximation of the vector, when the memory budget allocated to compression is insufficient. Interestingly, increasing T shifts the optimal trade-off towards allocating more bytes to the code. This may mean that the neighbors can be reached but may require more hops in the graphs.

Coding Vectors Vs Regression Coefficients.

In particular embodiments, the number of links is fixed to 6 and the refinement strategy under a fixed total memory constraint is then evaluated. In this case there may be a trade-off between the number of bytes allocated to the compression codec and to the refinement procedure. In particular embodiments, the trade-off may be considered under a constraint of 64 bytes and using k=6 links per indexed vector. The first observation drawn from Table 2 may be that the two refinement methods proposed in this section both significantly reduce the total square loss. This behavior may be expected for the 0-coding because it may be exactly what the method optimizes. However, this better reconstruction performance may not translate to a better recall in this setup. The reason of this observation may be that the 0-coding approach may give a clear gain when regressing with the exact neighbors, but those provided by the graph structure may have more long-range links. In contrast, the second refinement strategy is very effective. Coding the regression coefficients with the codebook significantly improves both the reconstruction loss and the recall: the refinement coding based on the graph may be more effective than the first-level coding, which may be agnostic of the local distribution of the vectors.

TABLE 2

Different trade-offs for allocating bytes to between codes for reconstruction and neighbors.

| | vector quantization error (×10³) | | exhaustive | | R@1 | |
| | | | | | T = 1024 | T = 16384 |
| | | | Deep: | | | |
| codec | 100M | 1B | 100M | 1B | 100M | 1B |
| L6&OPQ40 | 24.3 | 24.3 | 0.608 | 0.601 | 0.427 | 0.434 |
| L6&OPQ40 M = 0 | 22.7 | 22.5 | 0.611 | 0.600 | 0.429 | 0.435 |
| L6&OPQ36 M = 4 | 21.9 | 21.5 | 0.608 | 0.607 | 0.428 | 0.434 |
| L6&OPQ32 M = 8 | 20.0 | 19.8 | 0.625 | 0.612 | 0.438 | 0.438 |

Experiments

The experiments generally evaluate the search time versus accuracy tradeoff, considering also the size of the vector representation. The accuracy is measured as the fraction of cases where the actual nearest neighbor of the query is returned at rank 1 or before some other rank (recall @ rank). The search time is given in milliseconds per query on a 2.5 GHz server with 1 thread. Batching searches with multiple threads is trivial but timings are less reproducible.

i Baseline & Implementation

IMI is chosen as a baseline method because most recent works on large-scale indexing build upon it [30, 4, 7, 15] and top results for billion-scale search are reported by methods relying on it. The competitive implementation of Faiss [29] (in CPU mode) is used as the IMI baseline. The automatic hyperparameter tuning is used to optimize IMF s operating points. The parameters are the number of visited codes (7), the multiprobe number and the Hamming threshold used to compare polysemous codes [15].

The implementation of HNSW follows the original NM-SLIB version [9]. The most noticeable differences are that (i) vectors are added by batches because the full set of vectors does not fit in RAM, and (ii) the HNSW structure is built layer by layer, which may improve the quality of the graph. Indexing 1 billion vectors takes about 26 hours with L&C: more than 10,000 vectors per second can be added to the index. The refinement is performed at most 10 vectors.

For the encodings, a rotation estimated with Optimized Product Quantization (OPQ) is systematically performed to facilitate the encoding in the second level product quantizer.

ii Large-Scale Evaluation

The method is evaluated on two large datasets widely adopted by the computer vision community. BIGANN [28] is a dataset of 1B SIFT vectors in 256 dimensions, and Deep1B is a dataset of image descriptors extracted by a CNN. Both datasets come with a set of 10,000 query vectors, for which the ground-truth nearest neighbors are provided as well as a set of unrelated training vectors which are used to learn the codebooks for the quantizers. IMI codebooks are trained using 2 million vectors, and the regression codebooks of L&C are trained using 250k vectors and 10 iterations.

Figure 7A:
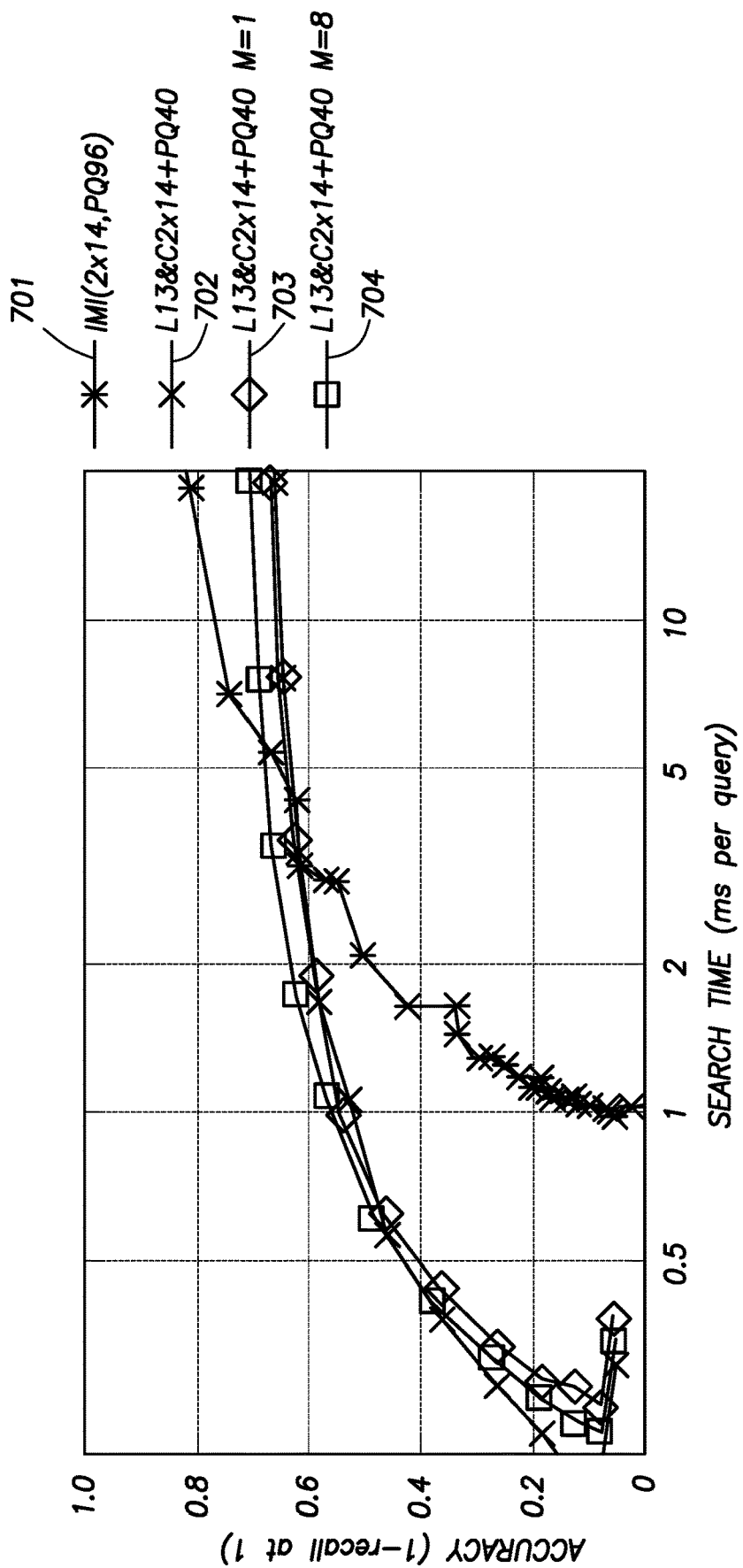
FIG. 7A illustrates an example comparison of the operating points in terms of search time versus accuracy.
Figure 7B:
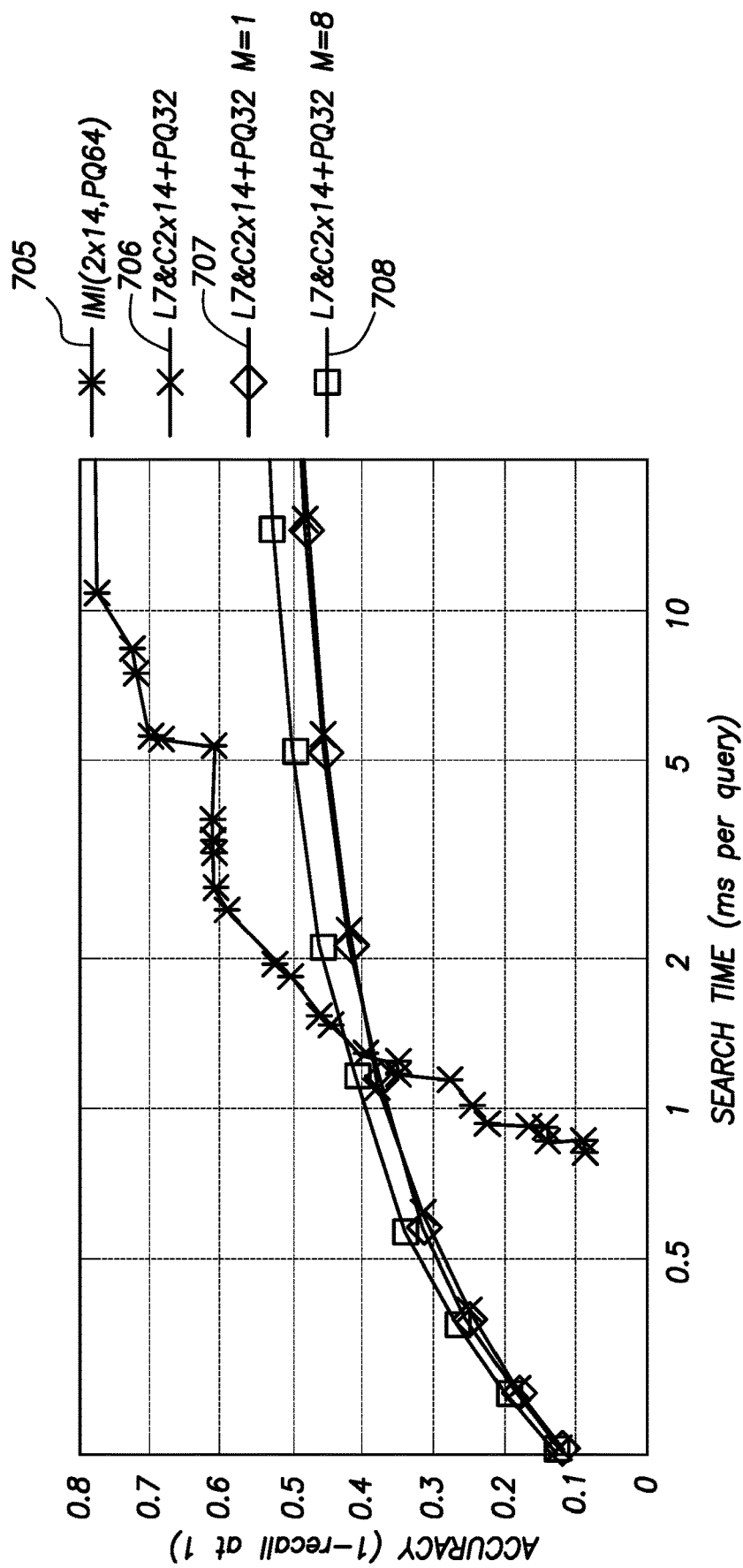
FIG. 7B illustrates another example comparison of the operating points in terms of search time versus accuracy.

FIGS. 7A-7B illustrate example comparisons of the operating points in terms of search time versus accuracy. The search time is measured per query on 1 core. FIG. 7A illustrates an example comparison of the operating points in terms of search time versus accuracy. The comparison is based on Deep1B for encodings that use 96 bytes per vector, including IMI(2×14, PQ96) 701, L13&C2×14+PQ40 702, L13&C2×14+PQ40 M=1 703, and L13&C2×14+PQ40 M=8 704. FIG. 7B illustrates another example comparison of the operating points in terms of search time versus accuracy. The comparison is based on BIGANN, including IMI(2×14, PQ64) 705, L7&C2×14+PQ32 706, L7&C2×14+PQ32 M=1 707, and L7&C2×14+PQ32 M=8 708. As illustrated in FIGS. 7A-7B, for most operating points, the L&C method is much faster. For example, it is 2.5× faster to attain a recall@1 of 50% on Deep1B. The improvement may be due to the refinement step, i.e., the regression from neighborhood is also significant. It consumes a few more bytes per vector (up to 8). For computationally expensive operating points, IMI is better for recall@1 because the 4k=52 bytes spent for links could be used to represent the vertices more accurately.

iii Comparison with the State of the Art

The L&C method is further compared with other results reported in the literature. Table 3 illustrates the comparison. The L&C method may use significantly more memory than others that are primarily focusing on optimizing the compromise between memory and accuracy. However, unlike HNSW, the L&C method may easily scale to 1 billion vectors on one server. The L&C method may be competitive when the time budget is small, and one is interested in higher accuracy. The competing methods are either much slower, or significantly less accurate. On Deep1B, only the polysemous codes attain an efficiency similar to the L&C method, obtained with a shorter memory footprint. However, it only attains recall@1=45.6%, against 66.7% for L&C. Considering the recall@1, the L&C method outperforms the state of the art on BIGANN by a large margin with respect to the accuracy/speed trade-off. It may be noted that increasing the coding size with other methods would increase accuracy but would also invariably increase the search time. Considering that, in a general application, the memory footprint may remain equivalent or smaller than other meta-data associated with images, for which the L&C method may offer an appealing and practical solution in most applications.

TABLE 3

Comparison with state of the art on two billion-sized datasets.

| | R@1 | R@10 | R@100 | Time (ms) | Bytes |
| --- | --- | --- | --- | --- | --- |
| BIGANN | | | | | |
| Multi-LOPQ [30] | 0.430 | 0.761 | 0.782 | 8 | 16 |
| OMulti-D-OADC-L [6] | 0.421 | 0.755 | 0.782 | 7 | 16 |
| FBPQ [4] | 0.179 | 0.523 | 0.757 | 1.9 | 16 |
| | 0.186 | 0.556 | 0.894 | 9.7 | 16 |
| Polysemous [15] | 0.330 | | 0.856 | 2.77 | 16 |
| L7&C32 M = 8 | 0.461 | 0.608 | 0.613 | 2.10 | 72 |
| Deep1B | | | | | |
| GNO-IMI [7] | 0.450 | 0.8 | | 20 | 16 |
| Polysemous [15] | 0.456 | | | 3.66 | 20 |
| L13&C40 M = 8 | 0.668 | 0.826 | 0.830 | 3.50 | 108 |

Conclusion

In the embodiments disclosed herein, a method, i.e., L&C, for precise approximate nearest neighbor search in billion-sized datasets has been disclosed. The L&C method may target the high-accuracy regime, which is important for a vast number of applications. The L&C method may make the bridge between the successful compressed-domain and graph-based approaches. The graph-based candidate generation may offer a higher selectivity than the traditional structures based on inverted lists. The compressed-domain search may allow the search to be scaled to billions of vectors on a vanilla server. As a key novelty, it is shown that the graph structure may be used to improve the distance estimation for a moderate or even null memory budget. As a result, state-of-the-art results on two public billion-sized benchmarks in the high-accuracy regime are reported. The L&C method is open-sourced in the Faiss library.

REFERENCES

The following list of references correspond to the citations above:
[1] Alexander I Rudnicky, Eric H Thayer, Paul C Constantinides, Chris Tchou, R Shern, Kevin A Lenzo, Wei Xu, and Alice Oh. Creating natural dialogs in the carnegie mellon communicator system. In *Eurospeech*, 1999.
[2] Antoine Raux, Brian Langner, Dan Bohus, Alan W Black, and Maxine Eskenazi. Let's go public! taking a spoken dialog system to the real world. In Interspeech, 2005.
[3] Steve Young, Milica Gašié, Blaise Thomson, and Jason D Williams. Pomdp-based statistical spoken dialog systems: A review. Proceedings of the IEEE, 101(5):1160-1179, 2013.
[4] Bing Liu, Gokhan Tur, Dilek Hakkani-Tur, Pararth Shah, and Larry Heck. End-to-end optimization of task-oriented dialogue model with deep reinforcement learning. arXiv preprint arXiv:1711.10712, 2017.
[5] Bing Liu, Gokhan Tur, Dilek Hakkani-Tur, Pararth Shah, and Larry Heck.
Dialogue learning with human teaching and feedback in end-to-end trainable task-oriented dialogue systems. arXiv preprint arXiv:1804.06512, 2018.
[6] Pararth Shah, Dilek Hakkani-Tur, Bing Liu, and Gokhan Tur. Bootstrapping a neural conversational agent with dialogue self-play, crowdsourcing and on-line reinforcement learning. In Proceedings of the 2018 Conference of the North American Chapter of the Association for Computational Linguistics: Human Language Technologies, Volume 3 (Industry Papers), volume 3, pages 41-51, 2018.
[7] Yang Liu, Kun Han, Zhao Tan, and Yun Lei. Using context information for dialog act classification in dnn framework. In Proceedings of the 2017 Conference on Empirical Methods in Natural Language Processing, pages 2170-2178, 2017.
[8] Jian Pei, Jiawei Han, Behzad Mortazavi-Asl, Helen Pinto, Qiming Chen, Umeshwar Dayal, and Mei-Chun Hsu. Prefixspan: Mining sequential patterns efficiently by prefix-projected pattern growth. In icccn, page 0215. IEEE, 2001.
[9] Milica Gasic and Steve Young. Gaussian processes for pomdp-based dialogue manager optimization. IEEE/ACM Transactions on Audio, Speech, and Language Processing, 2014.
[10] Pararth Shah, Dilek Hakkani-Tür, and Larry Heck. Interactive reinforcement learning for task-oriented dialogue management. In NIPS 2016 Deep Learning for Action and Interaction Workshop, 2016.
[11] Pei-Hao Su, Milica Gasic, Nikola Mrksic, Lina Rojas-Barahona, Stefan
Ultes, David Vandyke, Tsung-Hsien Wen, and Steve Young. On-line active reward learning for policy optimisation in spoken dialogue systems. In ACL, 2016.
[12] Pei-Hao Su, Pawel Budzianowski, Stefan Ultes, Milica Gasic, and Steve Young. Sample-efficient actor-critic reinforcement learning with supervised data for dialogue management. In SIGDIAL, 2017.
[13] Tsung-Hsien Wen, David Vandyke, Nikola Mrkšié, Milica Gašié, Lina M. Rojas-Barahona, Pei-Hao Su, Stefan Ultes, and Steve Young. A network-based end-to-end trainable task-oriented dialogue system. In EACL, 2017.
[14] Antoine Bordes and Jason Weston. Learning end-to-end goal-oriented dialog. In International Conference on Learning Representations, 2017.
[15] Bing Liu and Ian Lane. An end-to-end trainable neural network model with belief tracking for task-oriented dialog. In Interspeech, 2017.
[16] Tiancheng Zhao and Maxine Eskenazi. Towards end-to-end learning for dialog state tracking and management using deep reinforcement learning. In SIGDIAL, 2016.
[17] Xuijun Li, Yun-Nung Chen, Lihong Li, and Jianfeng Gao. End-to-end task-completion neural dialogue systems. arXiv preprint arXiv:1703.01008, 2017.
[18] Baolin Peng, Xiujun Li, Lihong Li, Jianfeng Gao, Asli Celikyilmaz, Sungjin Lee, and Kam-Fai Wong. Composite task-completion dialogue policy learning via hierarchical deep reinforcement learning. In Proceedings of EMNLP, 2017.
[19] Jan Ruben Zilke, Eneldo Loza Mencía, and Frederik Janssen. Deepred-rule extraction from deep neural networks. In International Conference on Discovery Science, pages 457-473. Springer, 2016.
[20] Hiroshi Tsukimoto. Extracting rules from trained neural networks. IEEE Transactions on Neural Networks, 11(2): 377-389, 2000.
[21] Rudy Setiono and Wee Kheng Leow. Fernn: An algorithm for fast
extraction of rules from neural networks. Applied Intelligence, 12(1-2):15-25, 2000.
[22] Ismail A Taha and Joydeep Ghosh. Symbolic interpretation of artificial neural networks. IEEE Transactions on knowledge and data engineering, 11(3):448-463, 1999.
[23] Marco Tulio Ribeiro, Sameer Singh, and Carlos Guestrin. Why should i trust you?: Explaining the predictions of any classifier. In Proceedings of the 22nd ACM SIGKDD international conference on knowledge discovery and data mining, pages 1135-1144. ACM, 2016.
[24] Dumitru Erhan, Yoshua Bengio, Aaron Courville, and Pascal Vincent. Visualizing higher-layer features of a deep network. University of Montreal, 1341(3):1, 2009.
[25] Quoc V Le. Building high-level features using large scale unsupervised learning. In Acoustics, Speech and Signal Processing (ICASSP), 2013 IEEE International Conference on, pages 8595-8598. IEEE, 2013.
[26] Karen Simonyan, Andrea Vedaldi, and Andrew Zisserman. Deep inside convolutional networks: Visualising image classification models and saliency maps. arXiv preprint arXiv:1312.6034, 2013.
[27] Rahul Iyer, Yuezhang Li, Huao Li, Michael Lewis, Ramitha Sundar, and Katia Sycara. Transparency and explanation in deep reinforcement learning neural networks. 2018.
[28] Rakesh Agrawal, Ramakrishnan Srikant, et al. Fast algorithms for mining association rules. In Proc. 20th int. conf. very large data bases, VLDB, volume 1215, pages 487-499, 1994.
[29] Jiawei Han, Jian Pei, and Yiwen Yin. Mining frequent patterns without candidate generation. In ACM sigmod record, volume 29, pages 1-12. ACM, 2000.

Figure 8:
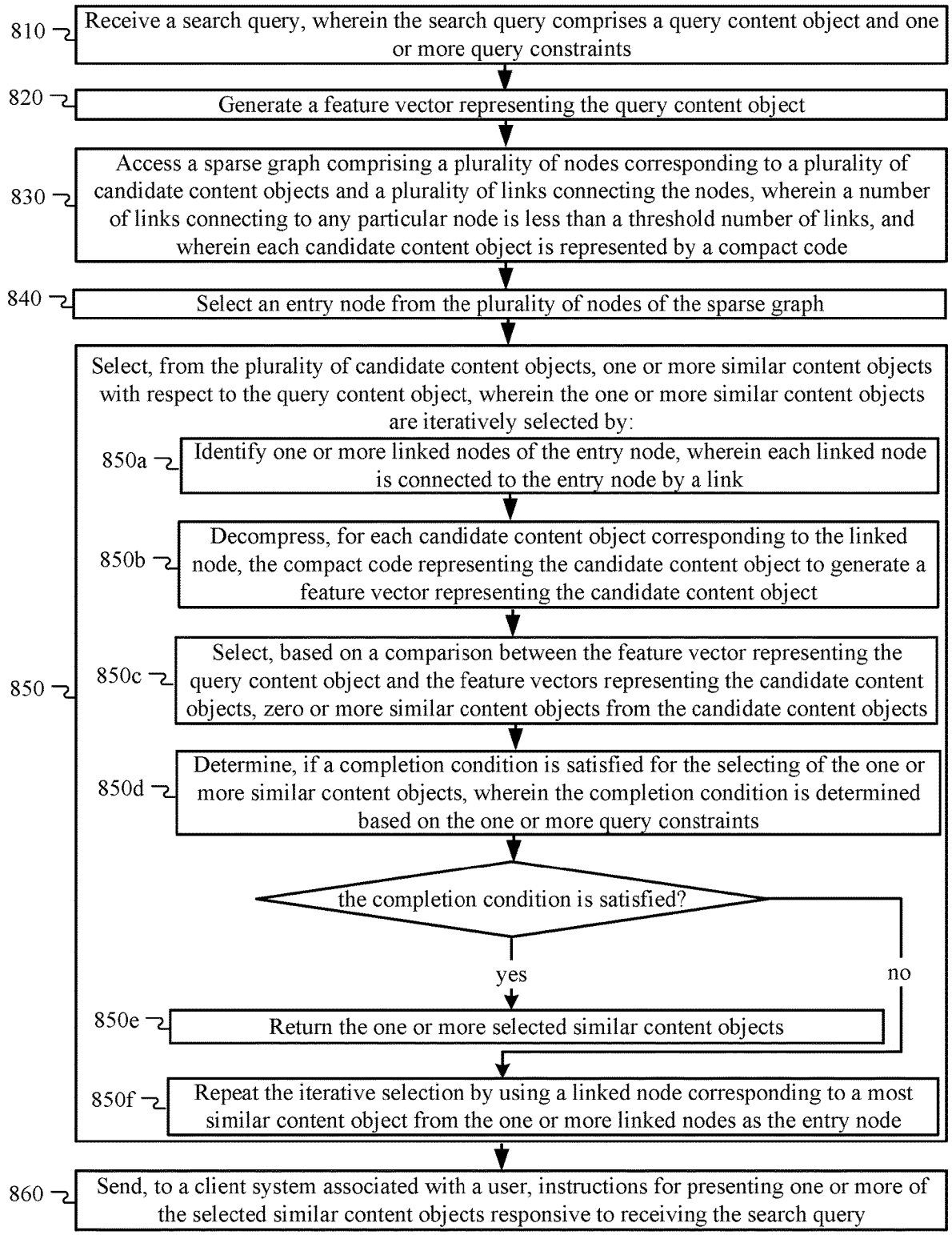
FIG. 8 illustrates an example method for similarity search based on graphs and compact codes.

FIG. 8 illustrates an example method 800 for similarity search based on graphs and compact codes. The method may begin at step 810, where the social-networking system 160 may receive a search query, wherein the search query comprises a query content object and one or more query constraints. At step 820, the social-networking system 160 may generate a feature vector representing the query content object. At step 830, the social-networking system 160 may access a sparse graph comprising a plurality of nodes corresponding to a plurality of candidate content objects and a plurality of links connecting the nodes, wherein a number of links connecting to any particular node is less than a threshold number of links, and wherein each candidate content object is represented by a compact code. At step 840, the social-networking system 160 may select an entry node from the plurality of nodes of the sparse graph. At step 850, the social-networking system 160 may select, from the plurality of candidate content objects, one or more similar content objects with respect to the query content object, wherein the one or more similar content objects are iteratively selected by the following sub-steps. At sub-step 850a, the social-networking system 160 may identify one or more linked nodes of the entry node, wherein each linked node is connected to the entry node by a link. At sub-step 850b, the social-networking system 160 may decompress, for each candidate content object corresponding to the linked node, the compact code representing the candidate content object to generate a feature vector representing the candidate content object. At sub-step 850c, the social-networking system 160 may select, based on a comparison between the feature vector representing the query content object and the feature vectors representing the candidate content objects, zero or more similar content objects from the candidate content objects. At sub-step 850d, the social-networking system 160 may determine, if a completion condition is reached for the selecting of the one or more similar content objects, wherein the completion condition is determined based on the one or more query constraints. Based on the determining, if the completion condition is satisfied, then at sub-step 850e the social-networking system 160 may return the one or more selected similar content objects; else if the completion condition is not satisfied, then at sub-step 850f the social-networking system 160 may repeat the iterative selection by using a linked node corresponding to a most similar content object from the one or more linked nodes as the entry node. At step 860, the social-networking system 160 may send, to a client system associated with a user, instructions for presenting one or more of the selected similar content objects responsive to receiving the search query. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for similarity search based on graphs and compact codes including the particular steps of the method of FIG. 8, this disclosure contemplates any suitable method for similarity search based on graphs and compact codes including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graphs

Figure 9:
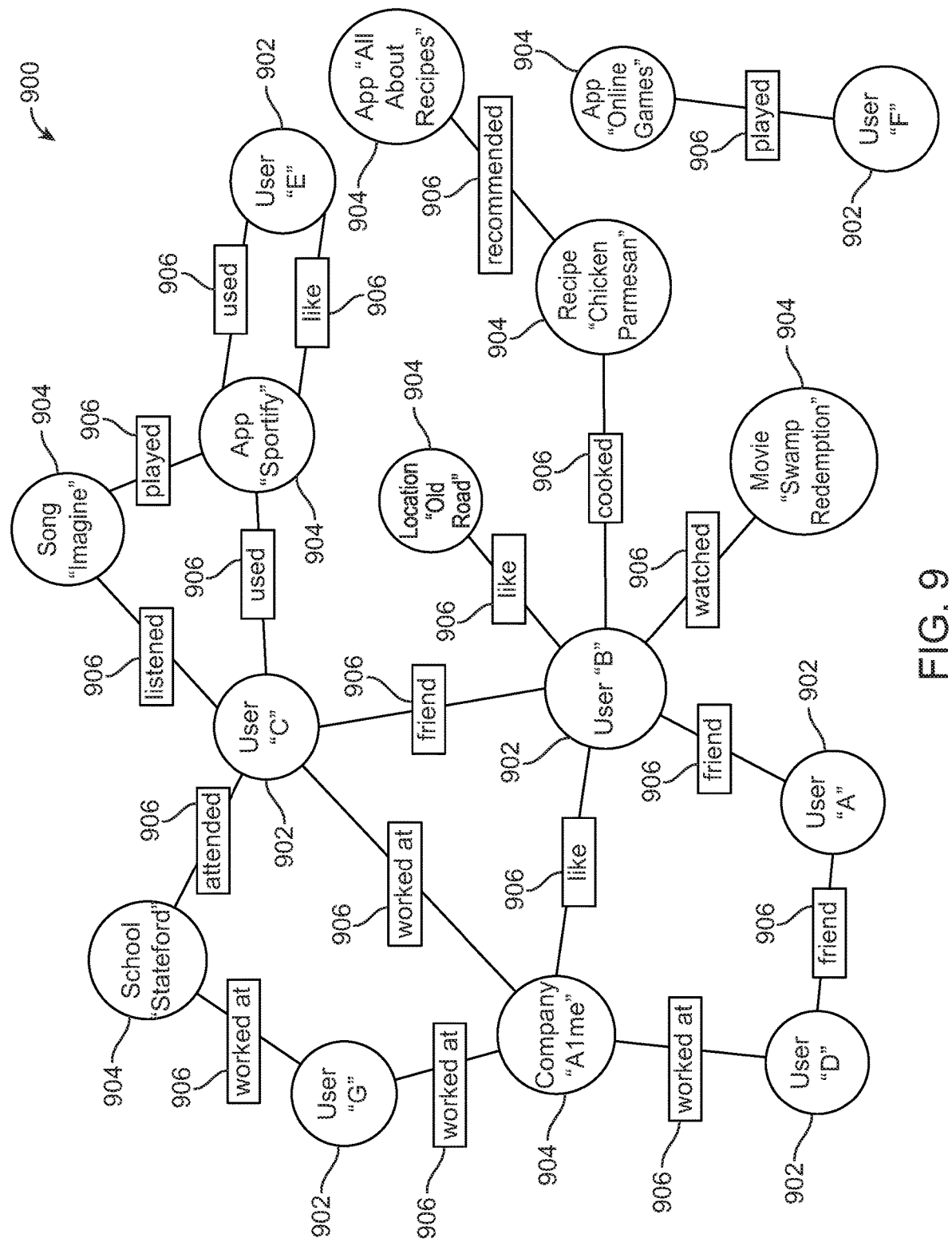
FIG. 9 illustrates an example social graph.

FIG. 9 illustrates an example social graph 900. In particular embodiments, the social-networking system 160 may store one or more social graphs 900 in one or more data stores. In particular embodiments, the social graph 900 may include multiple nodes—which may include multiple user nodes 902 or multiple concept nodes 904—and multiple edges 906 connecting the nodes. Each node may be associated with a unique entity (i.e., user or concept), each of which may have a unique identifier (ID), such as a unique number or username. The example social graph 900 illustrated in FIG. 9 is shown, for didactic purposes, in a two-dimensional visual map representation. In particular embodiments, a social-networking system 160, a client system 130, or a third-party system 170 may access the social graph 900 and related social-graph information for suitable applications. The nodes and edges of the social graph 900 may be stored as data objects, for example, in a data store (such as a social-graph database). Such a data store may include one or more searchable or queryable indexes of nodes or edges of the social graph 900.

In particular embodiments, a user node 902 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with the social-networking system 160. In particular embodiments, a user node 902 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more web interfaces.

In particular embodiments, a concept node 904 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more web interfaces.

In particular embodiments, a node in the social graph 900 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 904. Profile interfaces may be viewable by all or a selected subset of other users. As an example and not by way of limitation, a user node 902 may have a corresponding user-profile interface in which the corresponding user may add content, make declarations, or otherwise express himself or herself. As another example and not by way of limitation, a concept node 904 may have a corresponding concept-profile interface in which one or more users may add content, make declarations, or express themselves, particularly in relation to the concept corresponding to concept node 904.

In particular embodiments, a concept node 904 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 902 corresponding to the user and a concept node 904 corresponding to the third-party web interface or resource and store edge 906 in one or more data stores.

In particular embodiments, a pair of nodes in the social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 906 connecting the first user's user node 902 to the second user's user node 902 in the social graph 900 and store edge 906 as social-graph information in one or more of data stores 164. In the example of FIG. 9, the social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 900 by one or more edges 906. The degree of separation between two objects represented by two nodes, respectively, is a count of edges in a shortest path connecting the two nodes in the social graph 900. As an example and not by way of limitation, in the social graph 900, the user node 902 of user "C" is connected to the user node 902 of user "A" via multiple paths including, for example, a first path directly passing through the user node 902 of user "B," a second path passing through the concept node 904 of company "Acme" and the user node 902 of user "D," and a third path passing through the user nodes 902 and concept nodes 904 representing school "Stanford," user "G," company "Acme," and user "D." User "C" and user "A" have a degree of separation of two because the shortest path connecting their corresponding nodes (i.e., the first path) includes two edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile interface corresponding to a concept node 904 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 906 and a "used" edge (as illustrated in FIG. 9) between user nodes 902 corresponding to the user and concept nodes 904 corresponding to the song and application to indicate that the user listened to the song and used the application. Moreover, the social-networking system 160 may create a "played" edge 906 (as illustrated in FIG. 9) between concept nodes 904 corresponding to the song and the application to indicate that the particular song was played by the particular application. In this case, "played" edge 906 corresponds to an action performed by an external application on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904).

In particular embodiments, the social-networking system 160 may create an edge 906 between a user node 902 and a concept node 904 in the social graph 900. As an example and not by way of limitation, a user viewing a concept-profile interface (such as, for example, by using a web browser or a special-purpose application hosted by the user's client system 130) may indicate that he or she likes the concept represented by the concept node 904 by clicking or selecting a "Like" icon, which may cause the user's client system 130 to send to the social-networking system 160 a message indicating the user's liking of the concept associated with the concept-profile interface. In response to the message, the social-networking system 160 may create an edge 906 between user node 902 associated with the user and concept node 904, as illustrated by "like" edge 906 between the user and concept node 904. In particular embodiments, the social-networking system 160 may store an edge 906 in one or more data stores. In particular embodiments, an edge 906 may be automatically formed by the social-networking system 160 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 902, concept nodes 904, edges 906), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 902, concept nodes 904, or edges 906) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 900. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 902 or concept nodes 904, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 902, concept nodes 904, or edges 906 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 902, concept nodes 904, edges 906) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 902 or concept nodes 904, and displays names of matching edges 906 that may connect to the matching user nodes 902 or concept nodes 904, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 900 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 902 (where the social-networking system 160 has parsed the n-gram "my girlfriend" to correspond with a user node 902 for the user "Stephanie"), while the reference to "Friends" would correspond to friend-type edges 906 connecting that user node 902 to other user nodes 902 (i.e., edges 906 connecting to "Stephanie's" first-degree friends). When executing this structured query, the social-networking system 160 may identify one or more user nodes 902 connected by friend-type edges 906 to the user node 902 corresponding to "Stephanie". By providing suggested structured queries in response to a user's text query, the social-networking system 160 may provide a powerful way for users of the online social network to search for elements represented in the social graph 900 based on their social-graph attributes and their relation to various social-graph elements. Structured queries may allow a querying user to search for content that is connected to particular users or concepts in the social graph 900 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 900 to the concept node 904 corresponding to Stanford University, for example by like- or attended-type edges 906. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 10:
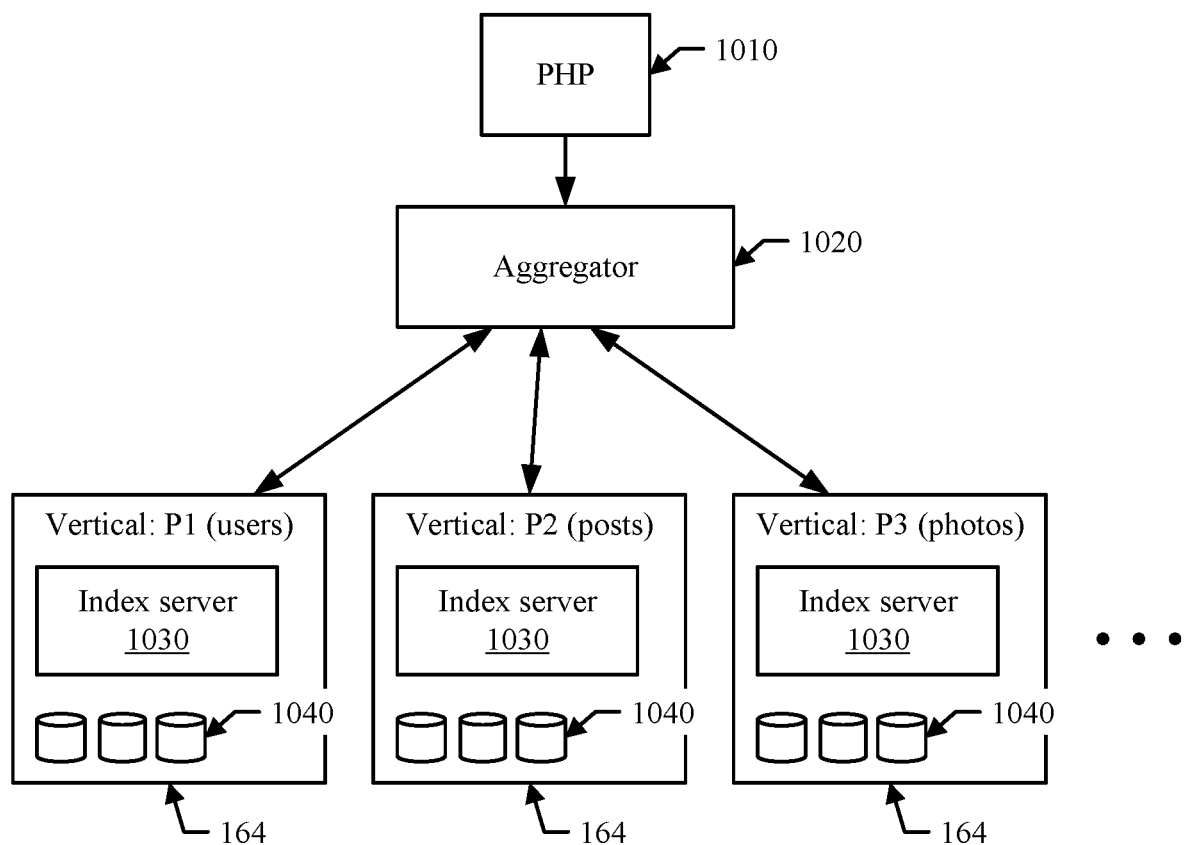
FIG. 10 illustrates an example partitioning for storing objects of a social-networking system.

FIG. 10 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 1040. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 10 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 10 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 1040.

In particular embodiments, objects stored in each vertical 164 may be indexed by one or more search indices. The search indices may be hosted by respective index server 1030 comprising one or more computing devices (e.g., servers). The index server 1030 may update the search indices based on data (e.g., a photo and information associated with a photo) submitted to social-networking system 160 by users or other processes of social-networking system 160 (or a third-party system). The index server 1030 may also update the search indices periodically (e.g., every 24 hours). The index server 1030 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 1010. The PHP process 1010 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 1020 may be configured to receive the search query from PHP process 1010 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 10. Each of the verticals 164 may be configured to store a single type of object indexed by a search index as described earlier. In particular embodiments, the aggregator 1020 may receive a search request. For example, the aggregator 1020 may receive a search request from a PHP process 1010. In particular embodiments, the search request may comprise a text string. The search request may be a structured or substantially unstructured text string submitted by a user via a PHP process. The search request may also be a structured or a substantially unstructured text string received from another process of the social-networking system. In particular embodiments, the aggregator 1020 may determine one or more search queries based on the received search request. In particular embodiments, each of the search queries may have a single object type for its expected results (i.e., a single result-type). In particular embodiments, the aggregator 1020 may, for each of the search queries, access and retrieve search query results from at least one of the verticals 164, wherein the at least one vertical 164 is configured to store objects of the object type of the search query (i.e., the result-type of the search query). In particular embodiments, the aggregator 1020 may aggregate search query results of the respective search queries. For example, the aggregator 1020 may submit a search query to a particular vertical and access index server 1030 of the vertical, causing index server 1030 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Vector Spaces and Embeddings

Figure 11:
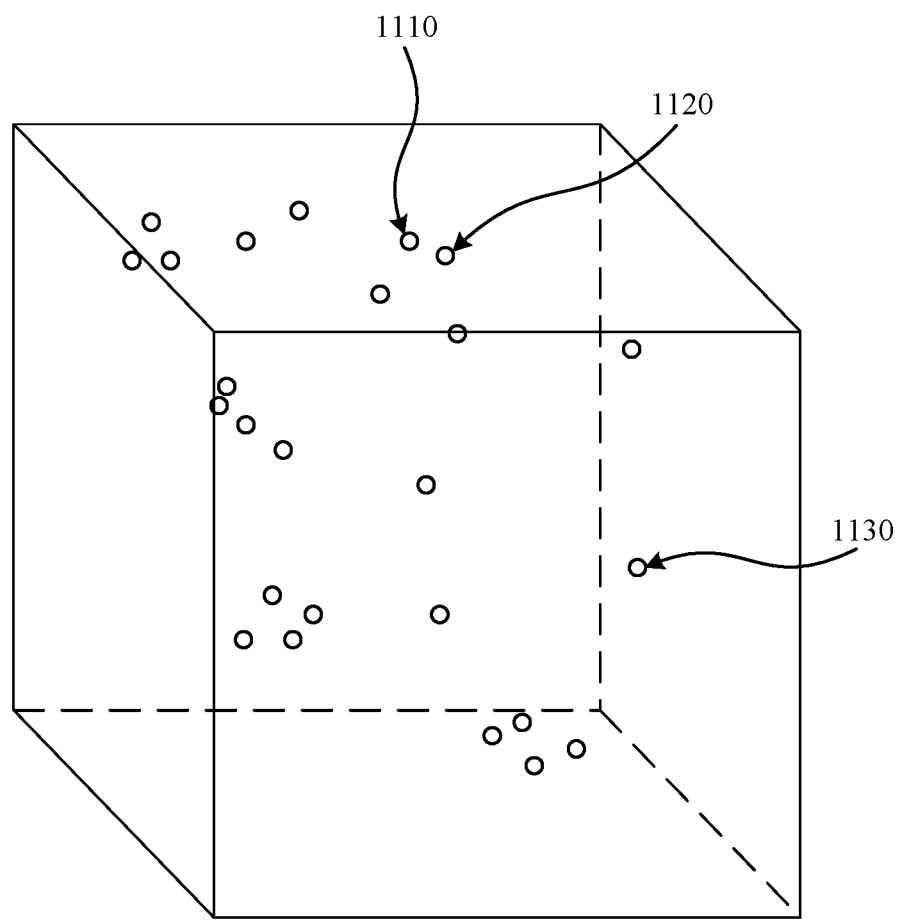
FIG. 11 illustrates an example view of an embedding space.

FIG. 11 illustrates an example view of a vector space 1100. In particular embodiments, an object or an n-gram may be represented in a d-dimensional vector space, where d denotes any suitable number of dimensions. Although the vector space 1100 is illustrated as a three-dimensional space, this is for illustrative purposes only, as the vector space 1100 may be of any suitable dimension. In particular embodiments, an n-gram may be represented in the vector space 1100 as a vector referred to as a term embedding. Each vector may comprise coordinates corresponding to a particular point in the vector space 1100 (i.e., the terminal point of the vector). As an example and not by way of limitation, vectors 1110, 1120, and 1130 may be represented as points in the vector space 1100, as illustrated in FIG. 11. An n-gram may be mapped to a respective vector representation. As an example and not by way of limitation, n-grams $t_1$ and $t_2$ may be mapped to vectors $\vec{v_i}$ and $\vec{v_2}$ in the vector space 1100, respectively, by applying a function $\vec{\pi}$ defined by a dictionary, such that $\vec{v_1}=\vec{\pi}(t_1)$ and $\vec{v_2}=\vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1100. In particular embodiments, an n-gram may be mapped to a vector representation in the vector space 1100 by using a machine leaning model (e.g., a neural network). The machine learning model may have been trained using a sequence of training data (e.g., a corpus of objects each comprising n-grams).

In particular embodiments, an object may be represented in the vector space 1100 as a vector referred to as a feature vector or an object embedding. As an example and not by way of limitation, objects $e_1$ and $e_2$ may be mapped to vectors and $\vec{v_2}$ in the vector space 1100, respectively, by applying a function $\vec{\pi}$, such that $\vec{v_1}=\vec{\pi}(e_i)$ and $\vec{v_2}=\vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1100. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1}-\vec{v_2}\|$. A similarity metric of two vectors may represent how similar the two objects or n-grams corresponding to the two vectors, respectively, are to one another, as measured by the distance between the two vectors in the vector space 1100. As an example and not by way of limitation, vector 1110 and vector 1120 may correspond to objects that are more similar to one another than the objects corresponding to vector 1110 and vector 1130, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 12:
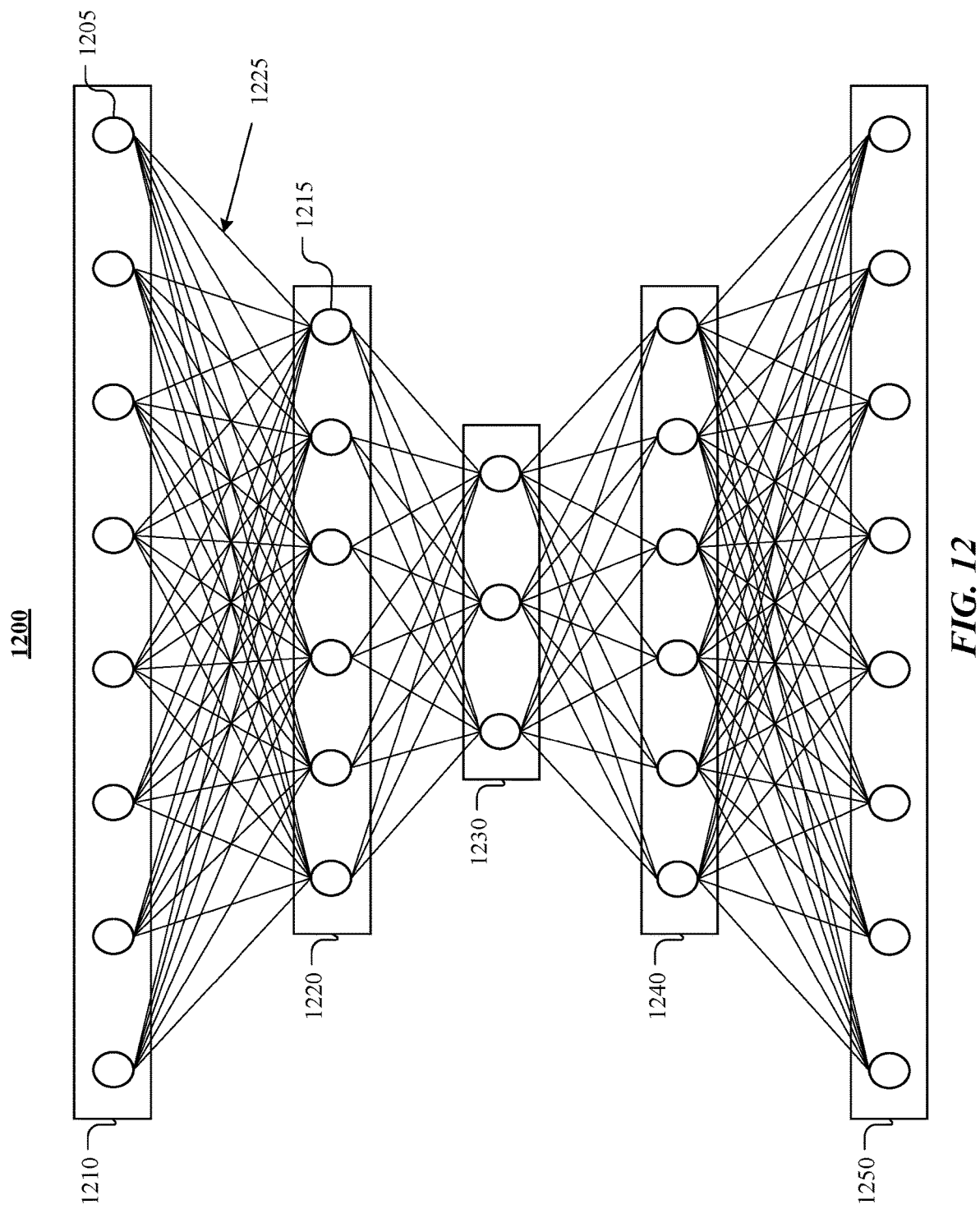
FIG. 12 illustrates an example artificial neural network.

FIG. 12 illustrates an example artificial neural network ("ANN") 1200. In particular embodiments, an ANN may refer to a computational model comprising one or more nodes. Example ANN 1200 may comprise an input layer 1210, hidden layers 1220, 1230, 1240, and an output layer 1250. Each layer of the ANN 1200 may comprise one or more nodes, such as a node 1205 or a node 1215. In particular embodiments, each node of an ANN may be connected to another node of the ANN. As an example and not by way of limitation, each node of the input layer 1210 may be connected to one of more nodes of the hidden layer 1220. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 12 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 12 depicts a connection between each node of the input layer 1210 and each node of the hidden layer 1220, one or more nodes of the input layer 1210 may not be connected to one or more nodes of the hidden layer 1220.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1220 may comprise the output of one or more nodes of the input layer 1210. As another example and not by way of limitation, the input to each node of the output layer 1250 may comprise the output of one or more nodes of the hidden layer 1240. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0,s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1225 between the node 1205 and the node 1215 may have a weighting coefficient of 0.4, which may indicate that 0.4 multiplied by the output of the node 1205 is used as an input to the node 1215. As another example and not by way of limitation, the output $y_k$ of node k may be $y_k=F_k(S_k)$, where $F_k$ may be the activation function corresponding to node k, $s_k=\Sigma_j (w_{jk}x_j)$ may be the effective input to node k, $x_1$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN1200 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 900, the social-networking system 160 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 13:
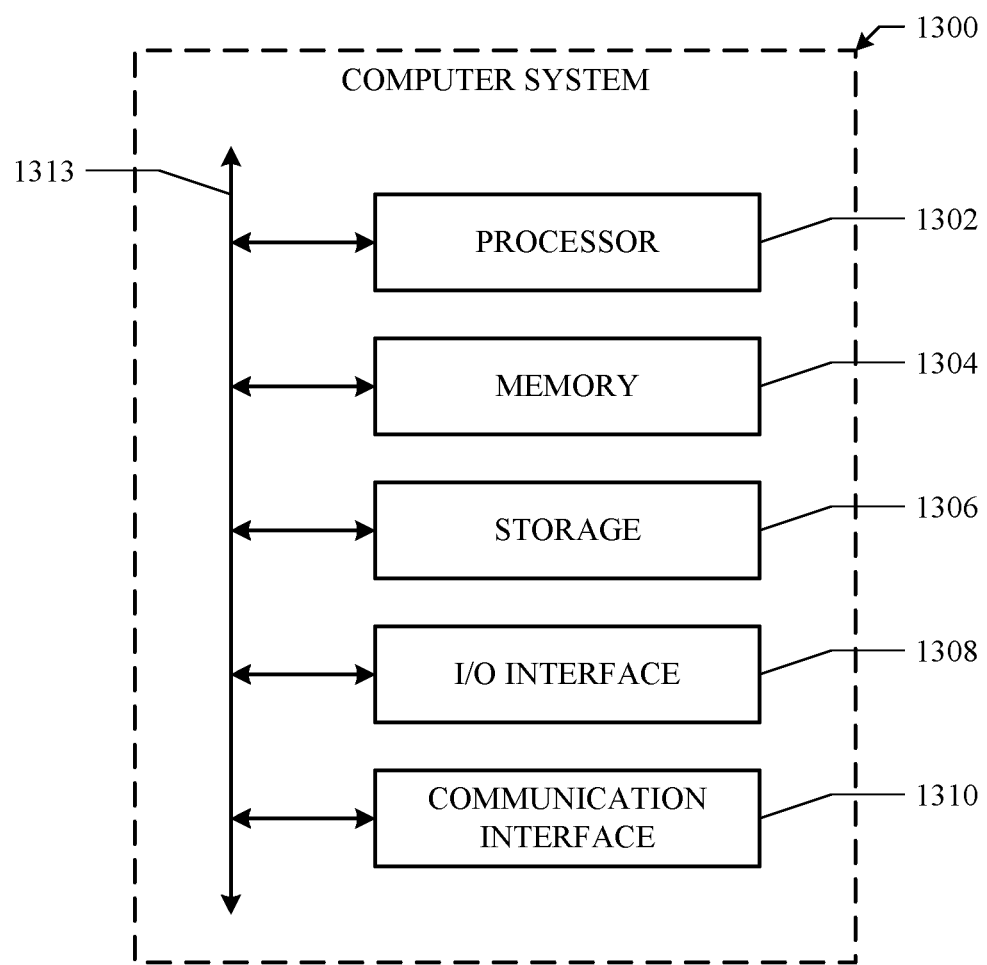
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    receiving a search query, wherein the search query comprises a query content object and one or more query constraints;
    generating a feature vector representing the query content object;
    accessing a sparse graph comprising a plurality of nodes corresponding to a plurality of candidate content objects and a plurality of links connecting the nodes, wherein a number of links connecting to any particular node is less than a threshold number of links, and wherein each candidate content object is represented by a compact code;
    selecting an entry node from the plurality of nodes of the sparse graph;
    selecting, from the plurality of candidate content objects, one or more similar content objects with respect to the query content object, wherein the one or more similar content objects are iteratively selected by:
        identifying one or more linked nodes of the entry node, wherein each linked node is connected to the entry node by a link;
        decompressing, for each candidate content object corresponding to the linked node, the compact code representing the candidate content object to generate a feature vector representing the candidate content object;
        selecting, based on a comparison between the feature vector representing the query content object and the feature vectors representing the candidate content objects, zero or more similar content objects from the candidate content objects;
        determining whether a completion condition is reached for the selecting of the one or more similar content objects, wherein the completion condition is determined based on one or more query constraints; and
        based on determining whether the completion condition is reached:
            returning the one or more selected similar content objects when the completion condition is reached; and
            repeating the iterative selection by using a linked node corresponding to a most similar content object from the one or more linked nodes as the entry node when the completion condition is not reached; and
    sending, to a client system associated with a user, instructions for presenting one or more of the selected similar content objects responsive to receiving the search query.

2. The method of claim 1, wherein the one or more query constraints comprise one or more of:
    a memory utilization or CPU utilization constraint;
    a selection accuracy constraint; or
    a search-query processing time constraint.

3. The method of claim 1, wherein the plurality of links of the sparse graph are generated by one or more machine-learning algorithms.

4. The method of claim 1, wherein the compact code for each candidate content object is generated based on one or more encodings.

5. The method of claim 4, wherein the one or more encodings comprise one or more of a product quantizer or an optimized product quantizer.

6. The method of claim 1, wherein each node in the sparse graph is associated with a cluster of candidate content objects, wherein each cluster of candidate objects is associated with a feature vector.

7. The method of claim 6, selecting the entry node from the plurality of nodes of the sparse graph comprises:
    selecting the entry node based on a comparison between the feature vector representing the query content object and the feature vectors representing the clusters of candidate content objects.

8. The method of claim 1, wherein decompressing the compact code representing each candidate content objects is based on one or more of:
    a refinement based on the compact code representing the candidate content object and one or more compact codes associated with one or more linked nodes of the node corresponding to the candidate content object; or
    the compact code representing the candidate content object and a regression codebook comprising a plurality of regression weight vectors.

9. The method of claim 8, wherein the refinement is based on one or more loss functions, and wherein the one or more loss functions associate the feature vector representing the candidate content object and a code matrix associated with the candidate content object, wherein the code matrix comprises the compact code representing the candidate content object and the compact codes associated with the linked nodes of the node corresponding to the candidate content object.

10. The method of claim 8, wherein the regression codebook is learned based on the plurality of candidate content objects and one or more loss functions.

11. The method of claim 10, wherein the regression codebook comprises a set of quantized regression coefficients for each candidate content object, and wherein generating the feature vector representing each candidate content object is further based on the set of quantized regression coefficients.

12. The method of claim 1, wherein the query content object comprises one or more of a text, an audio clip, an image, or a video clip.

13. The method of claim 1, wherein the feature vector representing the query content object is generated based on one or more machine-learning algorithms, and wherein the one or more machine-learning algorithms are based on a convolution neural network.

14. The method of claim 1, wherein the one or more linked nodes of the entry node comprise one or more short-range linked nodes and at least one long-range linked node.

15. The method of claim 14, wherein each of the one or more short-range linked nodes has a similarity-level greater than or equal to a threshold level with respect to the entry node.

16. The method of claim 14, wherein the at least one long-range linked node has a similarity-level less than a threshold level with respect to the entry node.

17. The method of claim 1, wherein the completion condition is determined based on the one or more query constraints.

18. One or more computer-readable non-transitory storage media embodying software that is operable when executed to:
receive a search query, wherein the search query comprises a query content object and one or more query constraints;
generate a feature vector representing the query content object;
access a sparse graph comprising a plurality of nodes corresponding to a plurality of candidate content objects and a plurality of links connecting the nodes, wherein a number of links connecting to any particular node is less than a threshold number of links, and wherein each candidate content object is represented by a compact code;
select an entry node from the plurality of nodes of the sparse graph;
select, from the plurality of candidate content objects, one or more similar content objects with respect to the query content object, wherein the one or more similar content objects are iteratively selected by:
identify one or more linked nodes of the entry node, wherein each linked node is connected to the entry node by a link;
decompress, for each candidate content object corresponding to the linked node, the compact code representing the candidate content object to generate a feature vector representing the candidate content object;
select, based on a comparison between the feature vector representing the query content object and the feature vectors representing the candidate content objects, zero or more similar content objects from the candidate content objects;
determine whether a completion condition is satisfied for the selecting of the one or more similar content objects, wherein the completion condition is determined based on the one or more query constraints; and
based on determining whether the completion condition is reached:
return the one or more selected similar content objects when the completion condition is reached; and
repeat the iterative selection by using a linked node corresponding to a most similar content object from the one or more linked nodes as the entry node when the completion condition is not reached; and
send, to a client system associated with a user, instructions for presenting one or more of the selected similar content objects responsive to receiving the search query.

19. A system comprising: one or more processors; and a non-transitory memory coupled to the processors comprising instructions executable by the processors, the processors operable when executing the instructions to:
receive a search query, wherein the search query comprises a query content object and one or more query constraints;
generate a feature vector representing the query content object;
access a sparse graph comprising a plurality of nodes corresponding to a plurality of candidate content objects and a plurality of links connecting the nodes, wherein a number of links connecting to any particular node is less than a threshold number of links, and wherein each candidate content object is represented by a compact code;
select an entry node from the plurality of nodes of the sparse graph;
select, from the plurality of candidate content objects, one or more similar content objects with respect to the query content object, wherein the one or more similar content objects are iteratively selected by:
identify one or more linked nodes of the entry node, wherein each linked node is connected to the entry node by a link;
decompress, for each candidate content object corresponding to the linked node, the compact code representing the candidate content object to generate a feature vector representing the candidate content object;
select, based on a comparison between the feature vector representing the query content object and the feature vectors representing the candidate content objects, zero or more similar content objects from the candidate content objects;
determine whether a completion condition is satisfied for the selecting of the one or more similar content objects, wherein the completion condition is determined based on the one or more query constraints; and
based on determining whether the completion condition is reached:
return the one or more selected similar content objects when the completion condition is reached; and
repeat the iterative selection by using a linked node corresponding to a most similar content object from the one or more linked nodes as the entry node when the completion condition is not reached; and
send, to a client system associated with a user, instructions for presenting one or more of the selected similar content objects responsive to receiving the search query.

* * * * *